(12) United States Patent
Shibayama

(10) Patent No.: US 8,296,203 B2
(45) Date of Patent: Oct. 23, 2012

(54) SYSTEM AND METHOD FOR LEGAL BILLING IN A NETWORKED ENVIRONMENT

(76) Inventor: Scott Shibayama, Granite Bay, CA (US)

( * ) Notice: Subject to any disclaimer, the term of this patent is extended or adjusted under 35 U.S.C. 154(b) by 0 days.

(21) Appl. No.: 13/098,441

(22) Filed: Apr. 30, 2011

(65) Prior Publication Data

US 2011/0208627 A1 Aug. 25, 2011

Related U.S. Application Data

(63) Continuation-in-part of application No. 11/803,318, filed on May 14, 2007, now Pat. No. 7,958,023.

(51) Int. Cl.
G07F 19/00 (2006.01)
H04M 15/00 (2006.01)

(52) U.S. Cl. ............. 705/34; 705/14.1; 705/40; 705/30; 705/9

(58) Field of Classification Search .................. None
See application file for complete search history.

(56) References Cited

U.S. PATENT DOCUMENTS

| | | | |
|---|---|---|---|
| 5,875,431 A | 2/1999 | Heckman | |
| 6,222,914 B1 | 4/2001 | McMullin | |
| 6,363,361 B1 | 3/2002 | Lundberg | |
| 6,366,925 B1 | 4/2002 | Meltzer | |
| 6,622,128 B1 | 9/2003 | Bedell | |
| 6,766,307 B1 | 7/2004 | Israel | |
| 6,826,269 B2 | 11/2004 | Afana | |
| 6,938,001 B2 | 8/2005 | Kimmel | |
| 7,043,489 B1 | 5/2006 | Kelley | |
| 7,076,439 B1 | 7/2006 | Jaggi | |
| 2001/0034675 A1 | 10/2001 | Belford | |
| 2002/0019741 A1 | 2/2002 | Heston | |
| 2002/0091598 A1 | 7/2002 | Farkas | |
| 2004/0143444 A1 | 7/2004 | Opsitnick | |
| 2004/0225621 A1 | 11/2004 | Lundberg | |
| 2004/0267558 A1* | 12/2004 | Lundberg | 705/1 |
| 2005/0144097 A1 | 6/2005 | Lundberg | |
| 2005/0203814 A1 | 9/2005 | Derry | |

(Continued)

FOREIGN PATENT DOCUMENTS

WO WO0184280 11/2001

(Continued)

OTHER PUBLICATIONS

Thinking Outside the box by Arther G. Greene Published May/Jun. 2004 "http://www.abanet.org/buslaw/blt/2004-05-06/greeene.html".*

(Continued)

*Primary Examiner* — Luna Champagne
(74) *Attorney, Agent, or Firm* — Salter IP Law; Jim H. Salter

(57) ABSTRACT

A computer-implemented method and system is disclosed in which a network-based e-commerce environment includes billing a client at a periodic flat rate for a pre-defined scope of legal advice in pre-defined areas of legal services and offering the client, as part of the periodic flat rate, an alternative billing option of participating in a litigation defense program having a graduated fee structure based on an outcome of a litigation. In other embodiments, a network-based e-commerce environment includes offering the client participation in an accrual of credits at a predetermined multiplier of the periodic flat rate paid whereby such credits are accrued over time and may be redeemed to offset legal fees otherwise payable.

20 Claims, 23 Drawing Sheets

U.S. PATENT DOCUMENTS

2005/0283420 A1  12/2005  Bailey
2006/0015420 A1  1/2006  Lundberg

FOREIGN PATENT DOCUMENTS

WO  WO2004006144  1/2004

OTHER PUBLICATIONS

Thinking outside the box—Leave the billable-hours factories behind—ABA Business Law Section (vol. 13, May/Jun. 2004, by Arthur G. Greene; http://www.abanet.org/buslaw/bltl2004-05-06/greene.shtml.

Law Fees not deductible, by Michael Lynch, Copyright 1999, Gale Group.

Implementing an Alternative Billing Program, by Joel A. Rose; http://www.joelarose.com/articles/managing_billing_systems.html.

Keeping costs under control by Jill Andresky Fraser, Boston: Mar. 1995, vol. 17, Iss. 3, p. 118.

\* cited by examiner

SYSTEM AND METHOD FOR LEGAL BILLING IN A NETWORKED ENVIRONMENT

PRIORITY APPLICATION

This is a continuation-in-part patent application of patent application Ser. No. 11/803,318; filed May 14, 2007 by the same applicant, now U.S. Pat. No. 7,958,023. This present patent application draws priority from the referenced patent application. The entire disclosure of the referenced patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2011, Scott Shibayama. All Rights Reserved.

BACKGROUND

1. Technical Field

This disclosure relates to methods and systems supporting network-based legal billing.

2. Related Art

U.S. Pat. No. 6,622,128 (the '128 patent) discloses a process by which litigation or legal billing may be both recorded and monitored in conjunction with budgetary constraints. Legal work products and expenses are logged by a user and recorded in a sortable database. Financial expectations (in the form of budget guidelines) held by an insurance carrier or client can be continuously kept in mind, while time and expenses accrue from an attorney's or legal team's efforts. As time or expenses are entered, corresponding budget information may be displayed. A unified interface provides easy browsing, data entry, and report generation. However, the basic billing model is a conventional hourly rate multiplied by a number of billable hours.

U.S. Patent Application No. 20050203814 (the '814 application) describes a litigation cost management system that provides modules for outlining the process of litigation, establishing pricing variables to each step of the litigation, all at the outset of the case. A case budget is then generated and the case is managed by outside counsel based upon the agreed upon budget and process. When exceptions occur during the course of litigation, outside counsel electronically submits requests for new work to corporate counsel, which in turn can be approved or denied. Point and click billing allows immediate simplistic invoicing which requires no review by corporate counsel as the work performed has already been approved. Statistical reporting provides corporate counsel with real time analysis of all the cases that are in the system. The '814 application describes a legal budgeting and cost management system; but there is no provision for changing the billing model.

U.S. Patent Application No. 20010034675 (the '675 application) describes methods and systems for tracking and approving legal expenses using a legal expense tracking system are disclosed. The method includes selecting a legal matter identifier for the legal work, engaging an outside counsel regarding planned legal work through a prompt, prompting the outside counsel to input data relating to expenses received from a legal services invoice, prompting a user for an approval of submitted legal invoices, and generating legal expense reports. However, again the '675 application does not describe a legal billing system that uses an unconventional billing model.

Thus, a method and system for legal billing using a variety of billing models is needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of an embodiment of the present invention. It will be evident, however, to one of ordinary skill in the art that embodiments may be practiced without these specific details.

Below are described various aspects of a networked legal billing system that provides a variety of billing models. A system architecture of an example networked legal billing platform is illustrated in FIG. 1.

Figure 1:
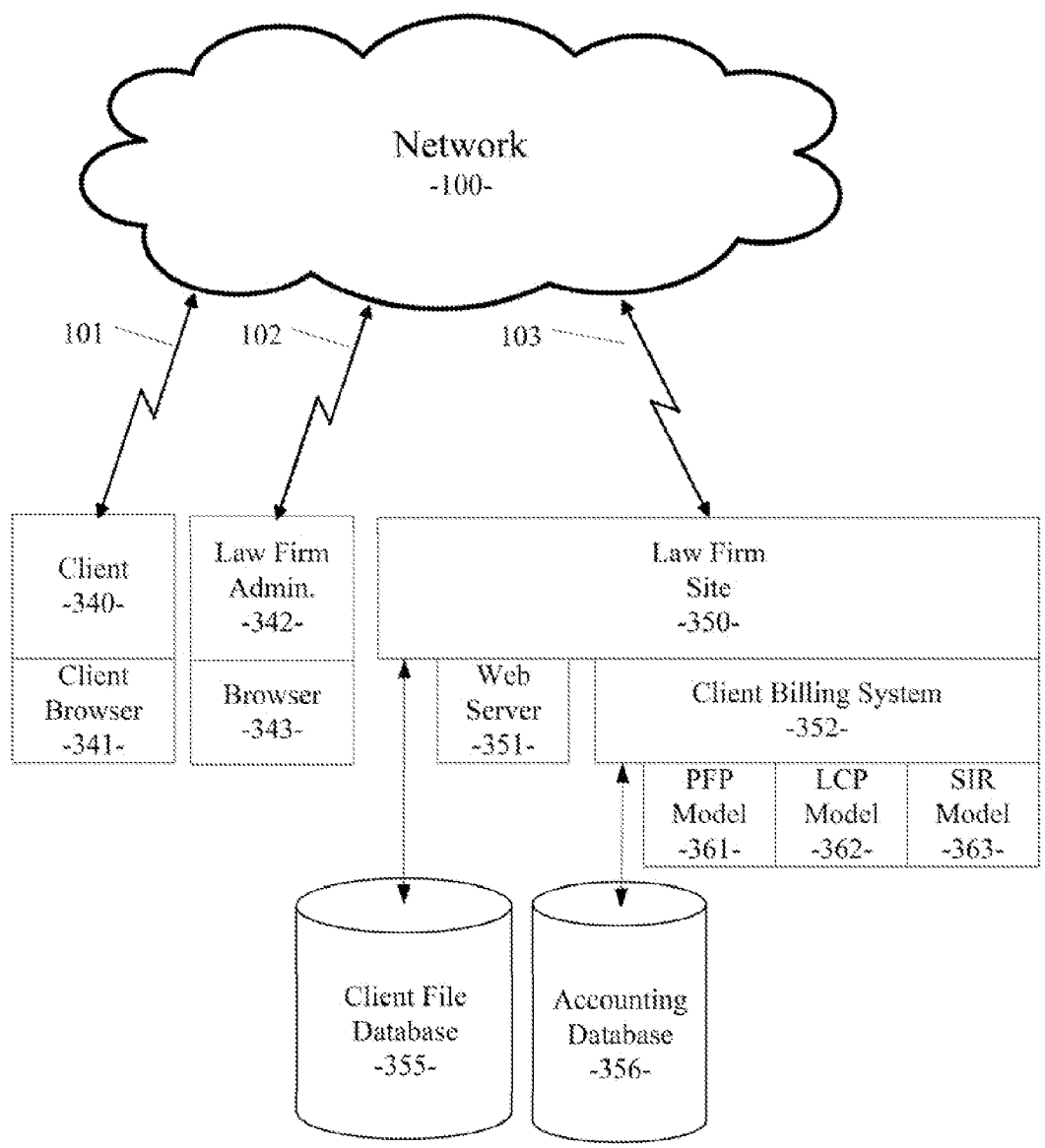
FIG. 1 illustrates an architectural network overview of an example embodiment.

Referring to FIG. 1, a networked legal billing system is shown to include a client system 340, a law service provider administrator (e.g. law service provider accounting manager or financial officer) system 342, and a law service provider site 350. Client system 340 represents a conventional client computer system, such as a conventional personal computer with a standard client browser 341 (e.g. Microsoft Internet Explorer) and a network connection 101 to a standard network 100 (e.g. the Internet, a proprietary intranet, or the like). A user/client can operate client system 340 to perform client transactions with law service provider site 350 via network 100. These client transactions can include transactions related to client billing for legal services performed by a law service provider associated with law service provider site 350. Note that the term law service provider as used herein can include law firms, partnerships, sole proprietors, law corporations, law departments in business or government, or any other entity that can provide legal services and receive compensation for same.

Referring still to FIG. 1, the law service provider administrator system 342 represents a conventional computer system, such as a conventional personal computer with a standard browser 343 (e.g. Microsoft Internet Explorer) and a network connection 102 to a standard network 100 (e.g. the Internet, a proprietary intranet, or the like). A user/law service provider administrator can operate law service provider administrator system 342 to perform law service provider administration transactions with law service provider site 350 via network 100. These law service provider administration transactions can include transactions related to client billing for legal services performed by the law service provider associated with law service provider site 350. It will be apparent to those of ordinary skill in the art that the law service provider administrator system 342 and/or the user/law service provider administrator can be given access privileges to access, edit, and/or delete information at the law service provider site 350 using conventional techniques.

The law service provider site 350, shown in FIG. 1, represents a conventional server/computer (e.g. a website operated by a law service provider) with a standard web server 351 and a network connection 103 to network 100. A financial representative or law service provider administrator of the law service provider can operate law service provider site 350 to perform financial transactions related to law service provider business via network 100. This law service provider business can include managing financial transactions related to client billing for legal services performed by the law service provider associated with law service provider site 350. The law service provider site 350 typically maintains a data repository 355 in which client file information can be stored and queried. The law service provider site 350 may also maintain a data repository 356 in which law service provider financial or accounting information can be stored and queried. It will be apparent to those of ordinary skill in the art that data repository 355 and 356 may equivalently be remotely connected to law service provider site 350 (e.g. via a network).

In various embodiments described herein, the law service provider associated with law service provider site 350 maintains client billing information using a client billing system 352. Client billing system 352 can be accessed and operated by a law service provider administrator using law service provider administrator system 342. Law service provider financial or accounting information used with client billing system 352 can be stored and accessed in data repository 356. In general, the client billing system 352 is used to collect the billable attorneys' fees and costs related to the performance of legal services for the law service provider's clients. In a conventional law service provider billing model, these attorney fees and costs are aggregated each month and billed to clients in a monthly billing cycle. In these conventional law service provider billing models, the time spent by each attorney, paralegal, or other billable law service provider representative is collected each billing time period (e.g. monthly), the time spent is multiplied by the billable representative's billing rate, and the charge is sent to the client in a client invoice. Client costs (e.g. court fees, copy charges, etc.) are also included in the client invoice sent to the client.

In various embodiments described herein, new client billing models are included with the conventional billing models. As shown in FIG. 1, client billing system 352 is shown to include a Predictable Fee Program (PFP) billing model 361, a Litigation Credit Program (LCP) billing model 362, and a Share In Risk Program (SIR) billing model 363. As will be described in more detail below, the client and the law service provider can agree to select a client billing model that best serves the needs of the client for a particular situation.

In an example embodiment, the PFP legal billing model 361 is a monthly flat rate program that includes a pre-defined scope of legal advice, legal research and simple document review for a fixed monthly fee. In a particular embodiment, such legal advice, legal research and simple document review may be limited to a specific legal field, such as employment and labor law issues. A client using the law service provider's online access functionality (e.g. a user of client system 340), using a telephone call, or via an in-person meeting may elect to activate The PFP legal billing model 361 for that client's legal matters with the law service provider associated with law service provider site 350. At that point, the client is eligible for a pre-defined scope of legal advice, legal research and simple document review for a fixed periodic (e.g. monthly) fee. The amount of the periodic PFP fee can be negotiated between the client and the law service provider.

In an example embodiment, the LCP legal billing model 362 adds an accumulation of a client credit that can be used for various client legal needs, such as litigation, due diligence investigations, merger/acquisition research, intellectual property investigation and prosecution, legal analysis, and the like. In one embodiment, the LCP program can be used in combination with the PFP program to give the client both a predictable periodic billing and a periodic accumulation of LCP credit. In one embodiment, the LCP program is charged to the client at twice (alternatively 1.5 times) the monthly rate for the basic PFP program and includes everything in the PFP program but adds: 1) a higher level of law firm service, including the creation and revision of documents, legal analysis, legal research, and the like, and 2) LCP credit as part of the LCP program. In one embodiment, the LCP credit is accumulated at the rate of 1.25 multiplied by the LCP monthly flat rate. If the client is sued or has other legal needs and chooses the law service provider associated with the LCP program to handle the other legal needs, the client may use accrued and available LCP credit in lieu of cash to pay the law service provider's legal service or litigation fees. The LCP Program may also be used with the SIR Program described below. In a particular embodiment, the LCP program is charged to the client as a multiple of the rate charged to the client for the PFP program. As such, the LCP program can still be a flat rate program as is the PFP program. However, it will be apparent to those of ordinary skill in the art that the LCP program can be charged at a rate not related to the PFP program rate, a graduated or variable rate, or a different rate model.

In an example embodiment, the SIR Program legal billing model 362 is a billing model in which a client pays differing amounts based on an outcome of a legal matter, such as litigation or other legal matter with clearly defined potential outcomes. For example, if a client enrolled in the SIR program is sued for an employment and labor matter, the law service provider associated with the SIR program will defend the client at the law service provider's standard hourly rate thereby producing a litigation charge billable to the client. However, in one embodiment, 20% (for a Non-PFP client) or 40% (for a PFP/LCP client) of the litigation charge will be placed in a "holdback" (FIB) account for the client. Then, based on a pre-defined and pre-agreed outcome of the legal matter, the client pays differing amounts based on the outcome of the legal matter. For example, if the client "wins" the litigation or receives a first pre-defined outcome in the legal matter, the client pays up to a first SIR rate (e.g. 100%) of the HB. If the litigation ends up in a "draw/tie" or receives a second pre-defined outcome in the legal matter, the client pays up to a second SIR rate (e.g. 50%) of the HB. If the client loses the legal matter or receives a third pre-defined outcome in the legal matter, the client pays up to a third SIR rate (e.g. 0%) of the HB. In this case, the law service provider may write off the entire HB. If the client is an LCP Program subscriber, the client may use accrued and available LCP credit to first offset whatever payment is due from the client on a periodic basis for litigation fees or other fees for legal matters handled by the law service provider.

Figure 2:
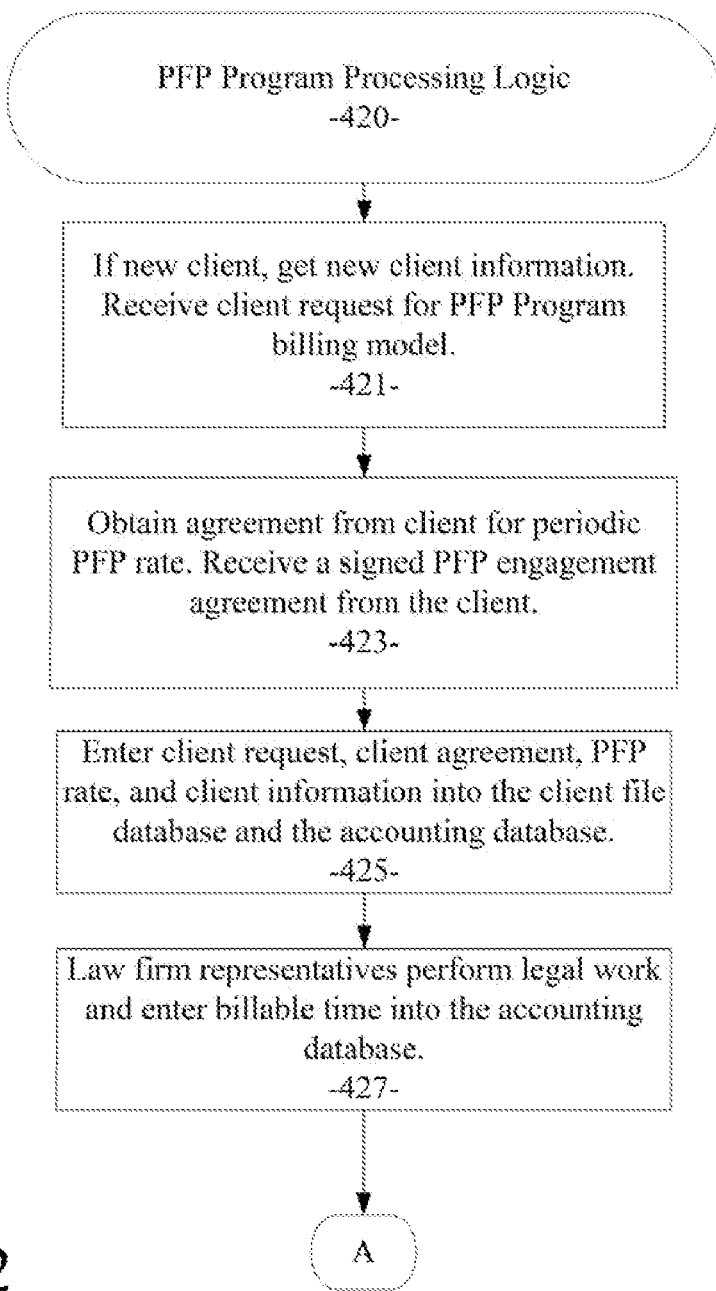
FIGS. 2-3 are flow diagrams illustrating the PFP Program processing logic used in one example embodiment.
Figure 3:
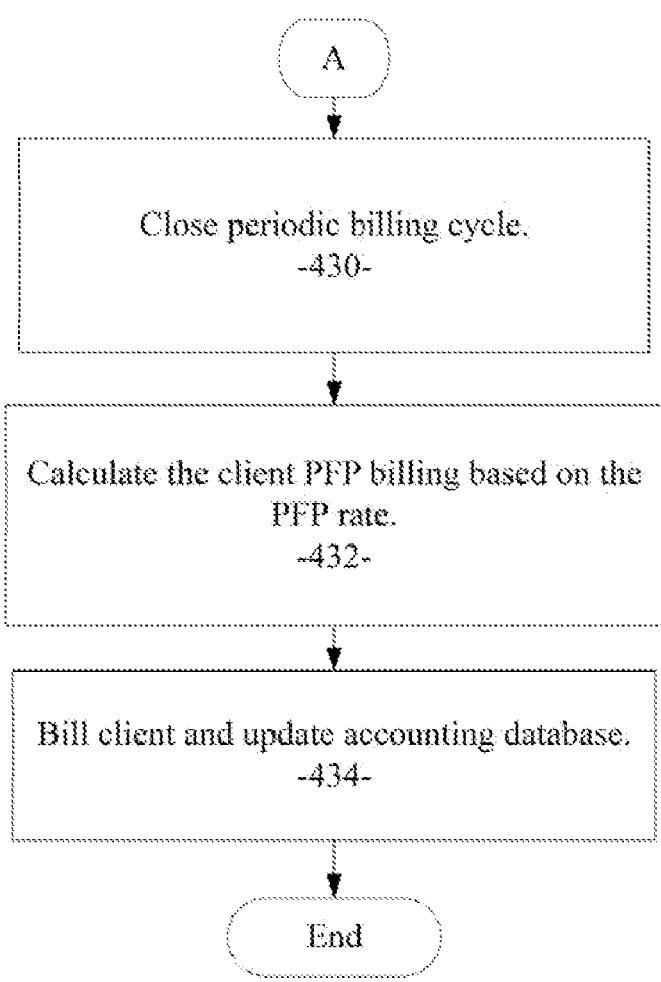

Referring now to FIGS. 2-3, flow diagrams illustrate the PFP Program processing logic used in one example embodiment. In processing block 421, a client may request or enroll in the PFP program. If the client is a new client that is not currently in the law service provider's system, standard client intake procedures may be used to gather necessary information from the client. Such PFP enrolment and client information gathering may be accomplished electronically using the networked system described above in connection with FIG. 1. In processing block 423, the client and a law service provider representative can agree on a rate (i.e. periodic fee) that will be charged to the client on a periodic basis for the benefits of the PFP program. These benefits include a pre-defined scope of legal advice, legal research and simple document review for a fixed periodic (e.g. monthly) fee. In one embodiment, the law service provider can establish a fixed PFP rate that is charged to all its clients. Having agreed on a PFP rate, the client can execute an engagement agreement that establishes an attorney/client relationship with the client and the law service provider and includes information indicating the client has enrolled in the PFP program. In processing block 425, the client request (i.e. PFP program enrolment), the PFP rate, the engagement agreement, and related client information is entered into the law service provider data repositories, including the client file database 355 and the accounting database 356. In processing block 427, the law service provider representatives, including attorneys, paralegals, and administrative staff can perform requested legal work for the client. The attorneys, paralegals, and other billable representatives of the law service provider enter their billable time for the client into the accounting database 356. It will be apparent to those of ordinary skill in the art that each billable representative of the law service provider can be billed to the client at different hourly rates. Such billing is typical in a conventional law firm. Processing continues at the bubble labelled A shown in FIG. 3.

Referring to FIG. 3, processing continues at the bubble labelled A. In processing block 430, the law service provider closes its periodic billing cycle. Typically, law service providers bill their clients on a monthly billing cycle, but other time periods can be equivalently used. In processing block 432, the client's PFP billing for the time period is calculated based on the PFP rate previously established. This PFP billing is invoiced to the client and entered into the accounting database 356 in processing block 434. Note that in the PFP billing model as described, the client is not billed based on the billable time entered by each billable representative of the law service provider. In contrast, the client is billed at a flat PFP rate for the time period (e.g. monthly). In this manner, the client can receive legal service from the law service provider and pay a predictable fee at the end of each billing cycle. Processing terminates at the End bubble shown in FIG. 3.

Figure 4:
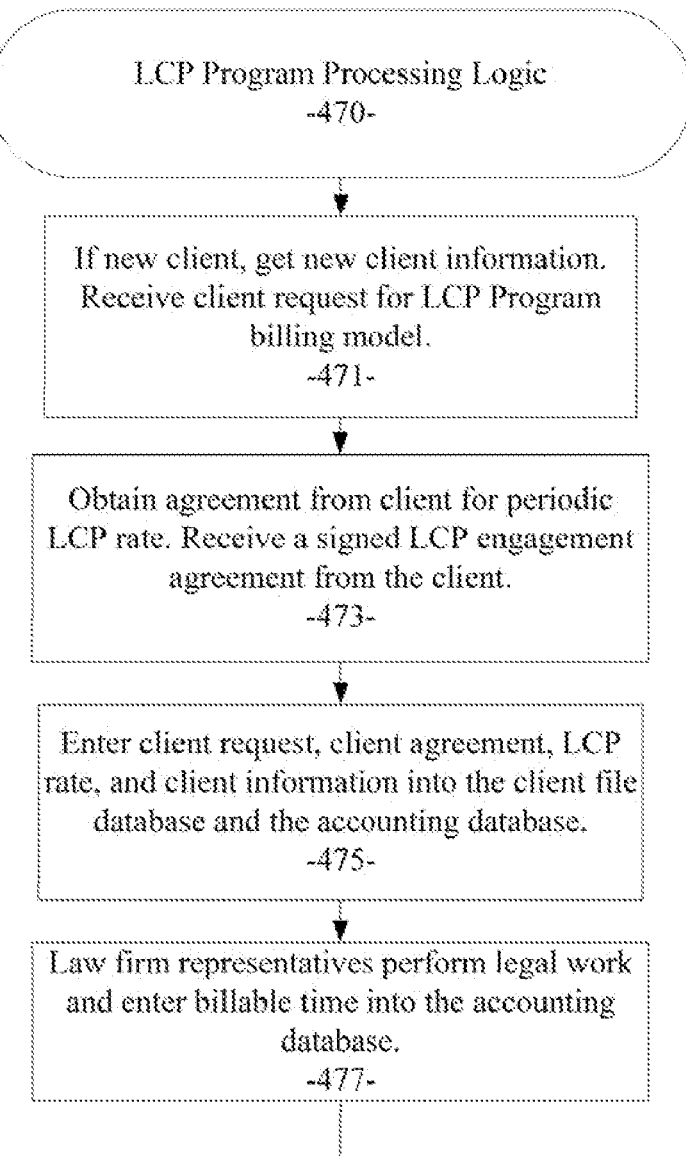
FIGS. 4-5 are flow diagrams illustrating the LCP Program processing logic used in one example embodiment.
Figure 5:
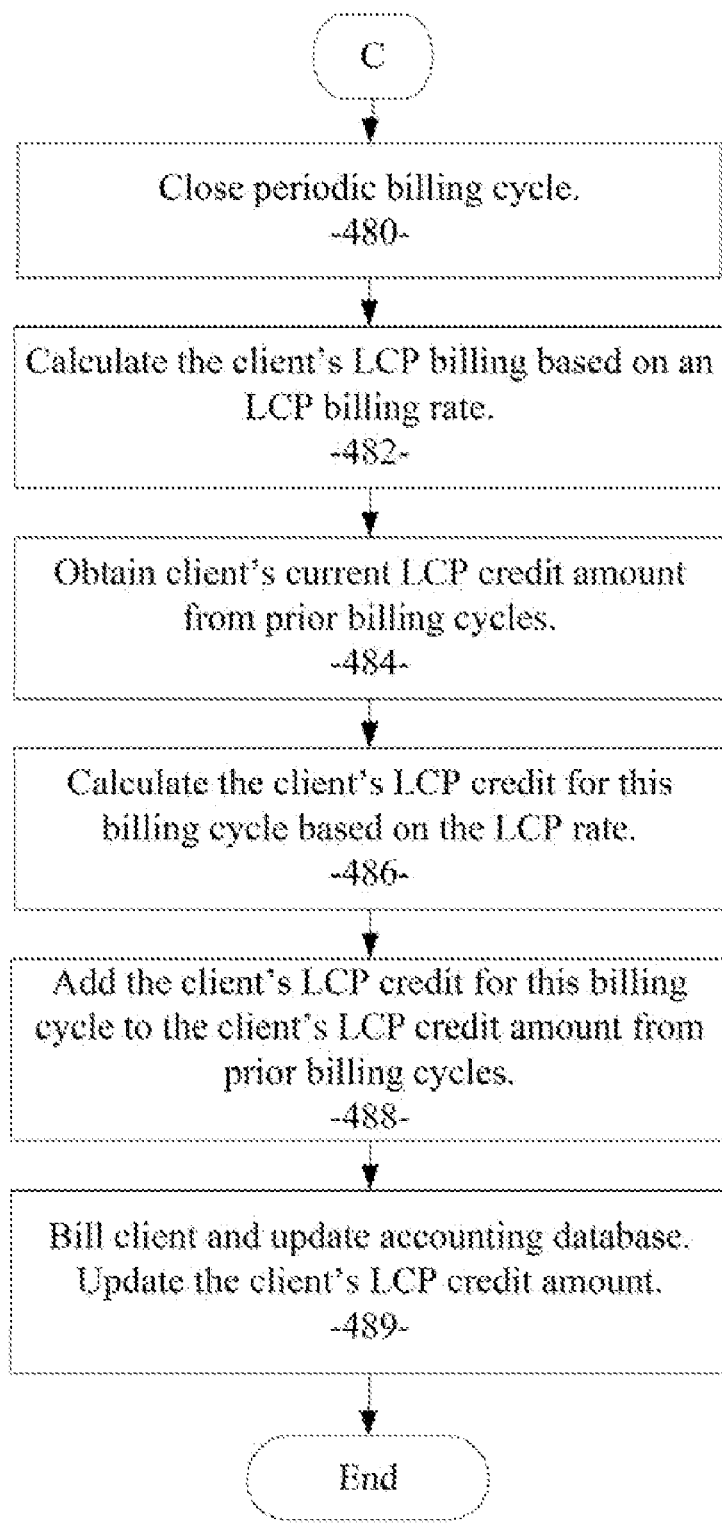

Referring now to FIGS. 4-5, flow diagrams illustrate the LCP Program processing logic used in one example embodiment. In processing block 471, a client may request or enroll in the LCP program. If the client is a new client that is not currently in the law service provider's system, standard client intake procedures may be used to gather necessary information from the client. Such LCP enrolment and client information gathering may be accomplished electronically using the networked system described above in connection with FIG. 1. In processing block 473, the client and a law service provider representative can agree on a rate or a multiplier (i.e. a client credit accumulation rate) that will be accumulated for the client on a periodic basis as part of the benefits of the LCP program. These benefits include an accumulation of a client credit that can be used for various client legal needs, such as litigation, due diligence investigations, merger/acquisition research, intellectual property investigation and prosecution, legal analysis, and the like. In one embodiment, the law service provider can establish a fixed LCP rate or multiplier that is used for client credit accumulation for all its clients. Having agreed on an LCP rate or multiplier, the client can execute an engagement agreement that establishes an attorney/client relationship with the client and law service provider and includes information indicating the client has enrolled in the LCP program. In processing block 475, the client request (i.e. LCP program enrolment), the LCP rate, the engagement agreement, and related client information is entered into the law service provider data repositories, including the client file database 355 and the accounting database 356. In processing block 477, the law service provider representatives, including attorneys, paralegals, and administrative staff can perform requested legal work for the client. The attorneys, paralegals, and other billable representatives of the law service provider enter their billable time for the client into the accounting database 356. It will be apparent to those of ordinary skill in the art that each billable representative of the law service provider can be billed to the client at different hourly rates. Such billing is typical in a conventional law firm. Processing continues at the bubble labelled C shown in FIG. 5.

Referring to FIG. 5, processing continues at the bubble labelled C. In processing block 480, the law service provider closes its periodic billing cycle. Typically, law service providers bill their clients on a monthly billing cycle, but other time periods can be equivalently used. In processing block 482, the client's LCP billing for the time period is calculated based on the LCP rate previously established. Note that in the LCP billing model as described, the client is not billed based on the billable time entered by each billable representative of the law service provider. In contrast, the client is billed at a flat LCP rate for the time period (e.g. monthly). In this manner, the client can receive legal service from the law service provider and pay a predictable fee at the end of each billing cycle. This LCP billing can be invoiced to the client and entered into the accounting database 356 in processing block 482. In processing block 484, the client's LCP credit as accumulated in prior billing cycles can be obtained from the accounting database 356. In processing block 486, the client's LCP billing for this billing period is multiplied by the LCP rate or multiplier for the client to produce the corresponding LCP client credit for this time period. In processing block 488, the calculated LCP client credit for this time period is added to the client's LCP credit as accumulated in prior billing cycles. The total aggregated LCP client credit is updated in the accounting database 356 for the client and the client is billed the LCP billing amount in block 489. Note that the client also accumulates an LCP client credit that the client can use for a future legal matter, such as litigation, due diligence investigations, merger/acquisition research, intellectual property investigation and prosecution, legal analysis, and the like. In such a legal matter, the client can elect to apply some or all of its accumulated LCP client credit to pay one or more invoices billed to the client from the law service provider. Processing terminates at the End bubble shown in FIG. 5.

Figure 6:
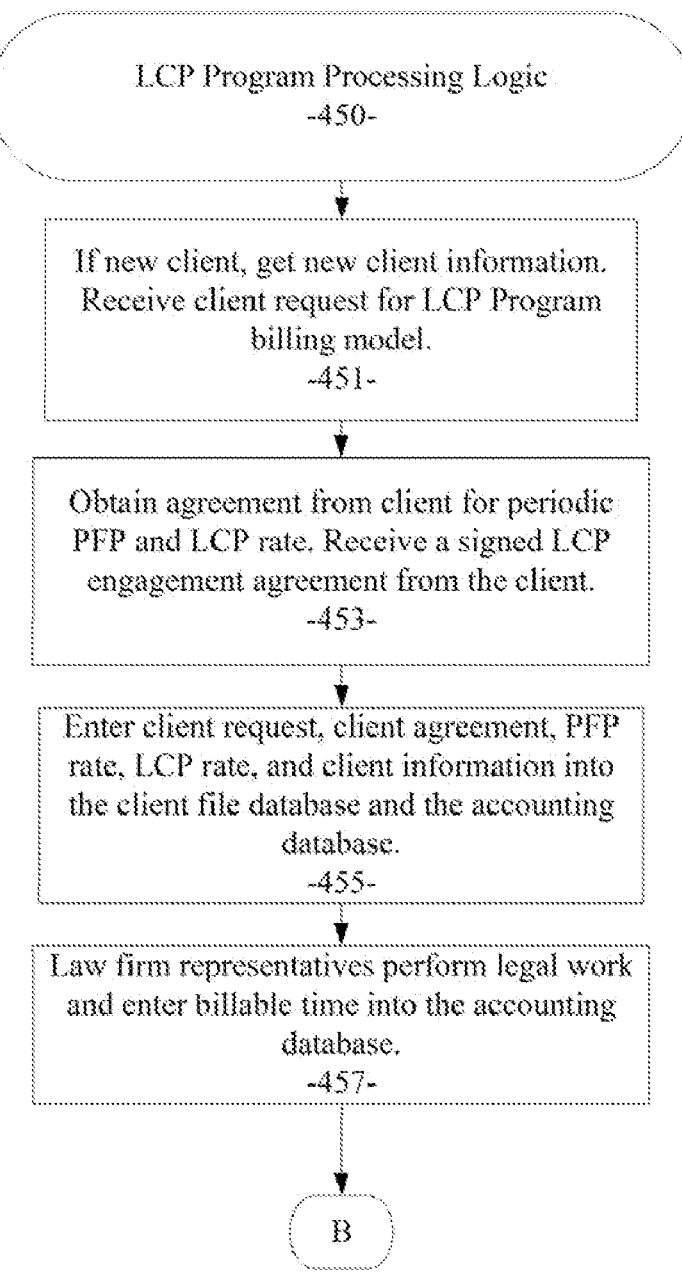
FIGS. 6-7 are flow diagrams illustrating a combination of the PFP Program and the LCP Program processing logic used in one example embodiment.
Figure 7:
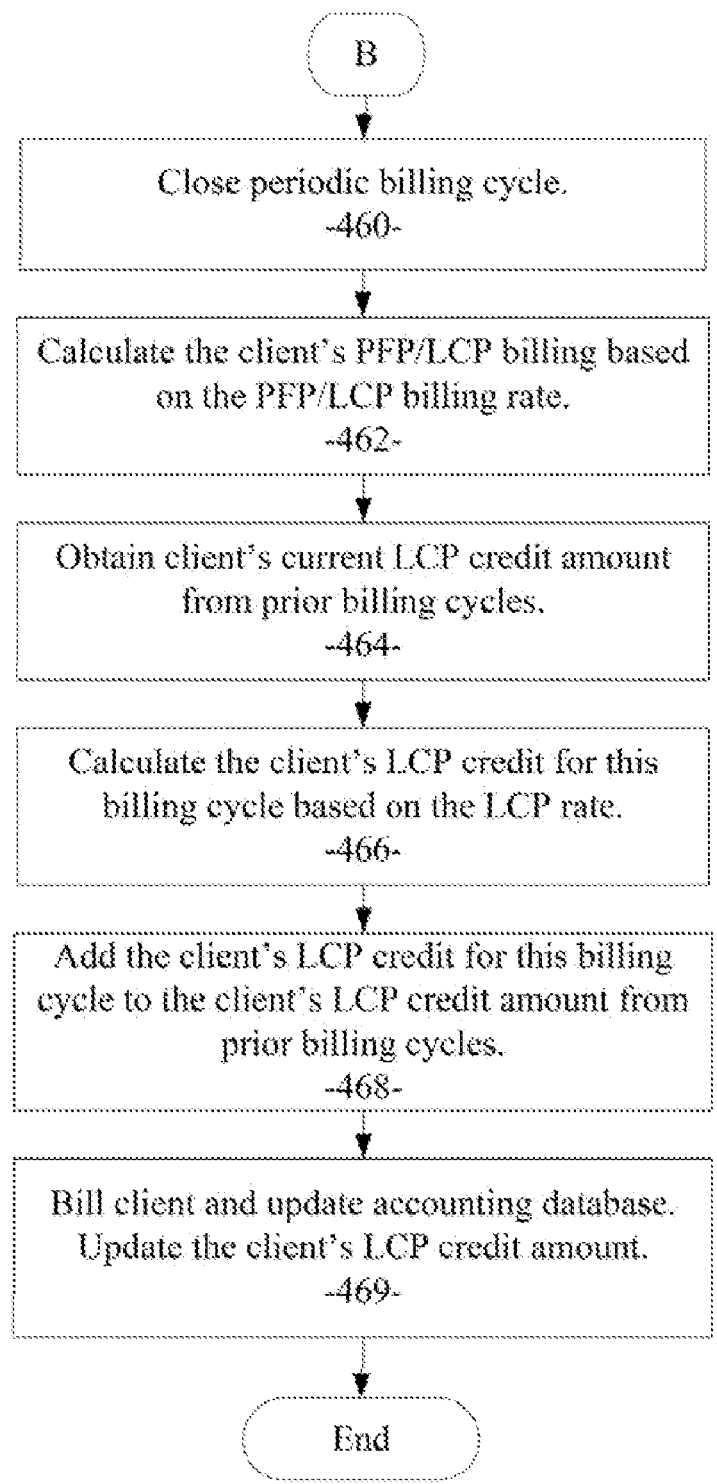

Referring now to FIGS. 6-7, flow diagrams illustrate a combination of the PFP Program and the LCP Program processing logic used in one example embodiment. In processing block 451, a client may request or enroll in the LCP program. In this example, it is assumed that the client has already enrolled in the PFP program as shown and described in connection with FIGS. 2-3. Referring again to FIG. 6, in processing block 453, the client and a law service provider representative can agree on a rate (i.e. periodic fee) that will be charged to the client on a periodic basis for the benefits of the PFP program. These benefits include a pre-defined scope of legal advice, legal research and simple document review for a fixed periodic (e.g. monthly) fee. In one embodiment, the law service provider can establish a fixed PFP rate that is charged to all its clients. Also in processing block 453, the client and a law service provider representative can agree on a rate or multiplier (i.e. a client credit accumulation rate) that will be accumulated for the client on a periodic basis as part of the benefits of the LCP program. These benefits include a higher level of legal service and an accumulation of a client credit that can be used for various client legal needs, such as litigation, due diligence investigations, merger/acquisition research, intellectual property investigation and prosecution, legal analysis, and the like. In one embodiment, the law service provider can establish a fixed LCP rate or multiplier that is used for client credit accumulation for all its clients. Having agreed on a PFP rate and an LCP rate, the client can execute an engagement agreement that establishes an attorney/client relationship with the client and law service provider and includes information indicating the client has enrolled in the PFP and LCP programs. In processing block 455, the client request (i.e. PFP and LCP program enrolment), the PFP rate, the LCP rate, the engagement agreement, and related client information is entered into the law service provider data repositories, including the client file database 355 and the accounting database 356. In processing block 457, the law service provider representatives, including attorneys, paralegals, and administrative staff can perform requested legal work for the client. The attorneys, paralegals, and other billable representatives of the law service provider enter their billable time for the client into the accounting database 356. It will be apparent to those of ordinary skill in the art that each billable representative of the law service provider can be billed to the client at different hourly rates. Such billing is typical in a conventional law firm. Processing continues at the bubble labelled B shown in FIG. 7.

Referring to FIG. 7, processing continues at the bubble labelled B. In processing block 460, the law service provider closes its periodic billing cycle. Typically, law service providers bill their clients on a monthly billing cycle, but other time periods can be equivalently used. In processing block 462, the client's PFP/LCP billing for the time period is calculated based on the PFP/LCP rate previously established. This PFP/LCP billing can be invoiced to the client and entered into the accounting database 356 in processing block 462. Note that in the PFP and LCP billing model as described, the client is not billed based on the billable time entered by each billable representative of the law service provider. In contrast, the client is billed at a flat PFP/LCP rate for the time period (e.g. monthly). In this manner, the client can receive legal service from the law service provider and pay a predictable fee at the end of each billing cycle. In processing block 464, the client's LCP credit as accumulated in prior billing cycles can be obtained from the accounting database 356. In processing block 466, the client's PFP/LCP billing for this billing period based on the PFP/LCP rate is multiplied by the LCP rate or multiplier for the client to produce the corresponding LCP client credit for this time period. In processing block 468, the calculated LCP client credit for this time period is added to the client's LCP credit as accumulated in prior billing cycles. The total aggregated LCP client credit is updated in the accounting database 356 for the client and the client is billed the gross billing amount in block 469. Note that in the PFP/LCP billing model as described, the client is billed based on the LCP rate. However, the client also accumulates an LCP client credit that the client can use for a future legal matter, such as litigation, due diligence investigations, merger/acquisition research, intellectual property investigation and prosecution, legal analysis, and the like. In such a legal matter, the client can elect to apply some or all of its LCP client credit to pay one or more invoices billed to the client from the law service provider. Processing terminates at the End bubble shown in FIG. 7.

Figure 8:
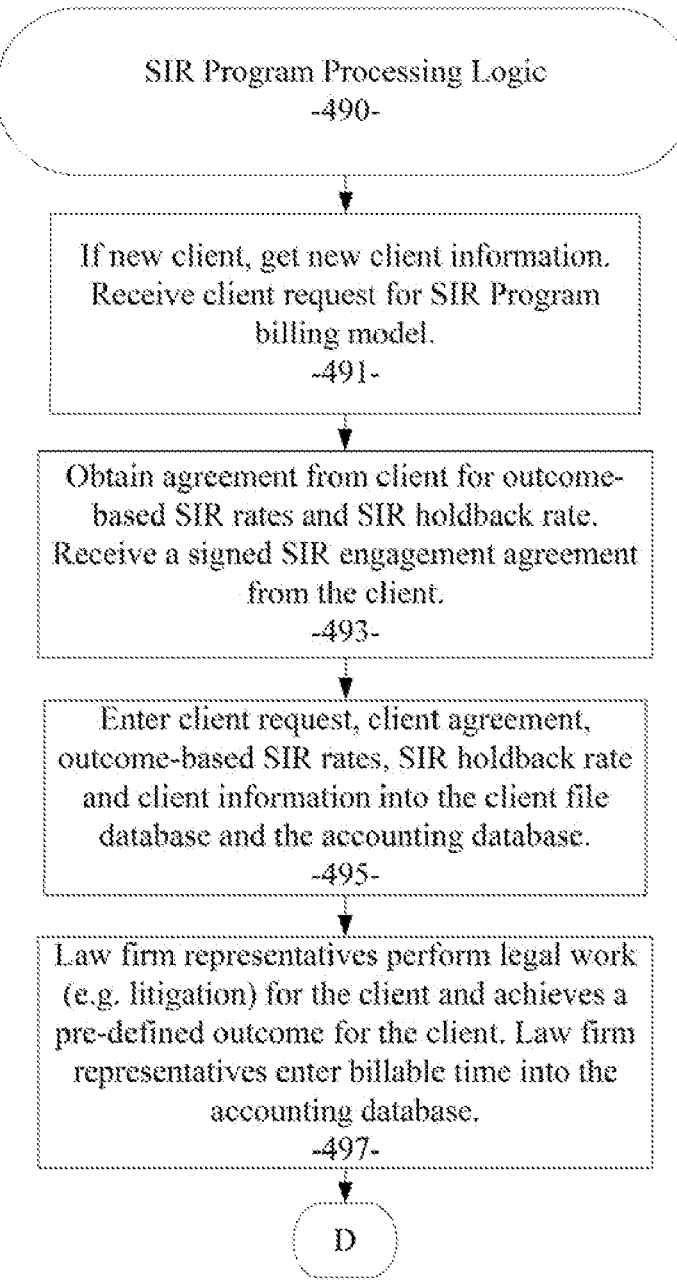
FIGS. 8-10 are flow diagrams illustrating the SIR Program processing logic used in one example embodiment.
Figure 9:
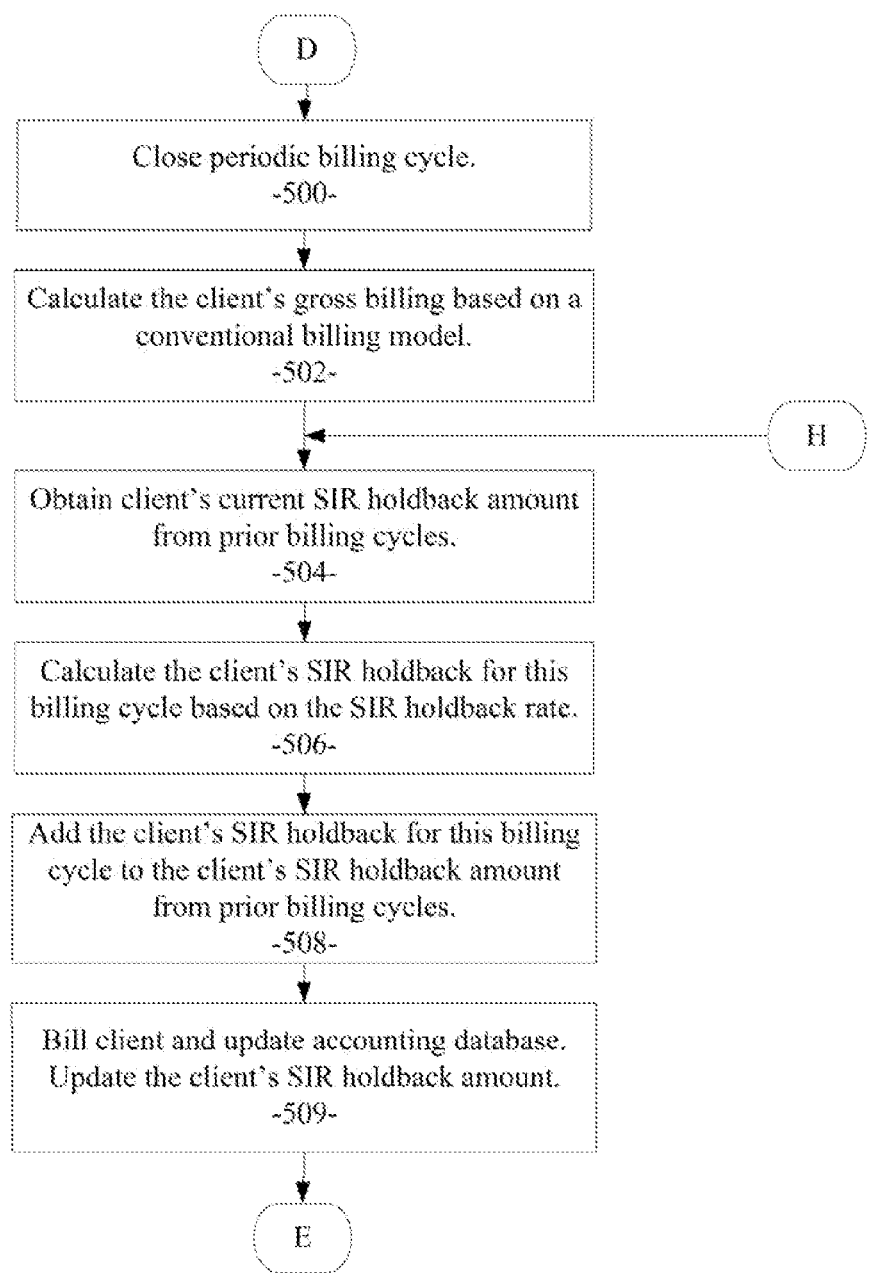
Figure 10:
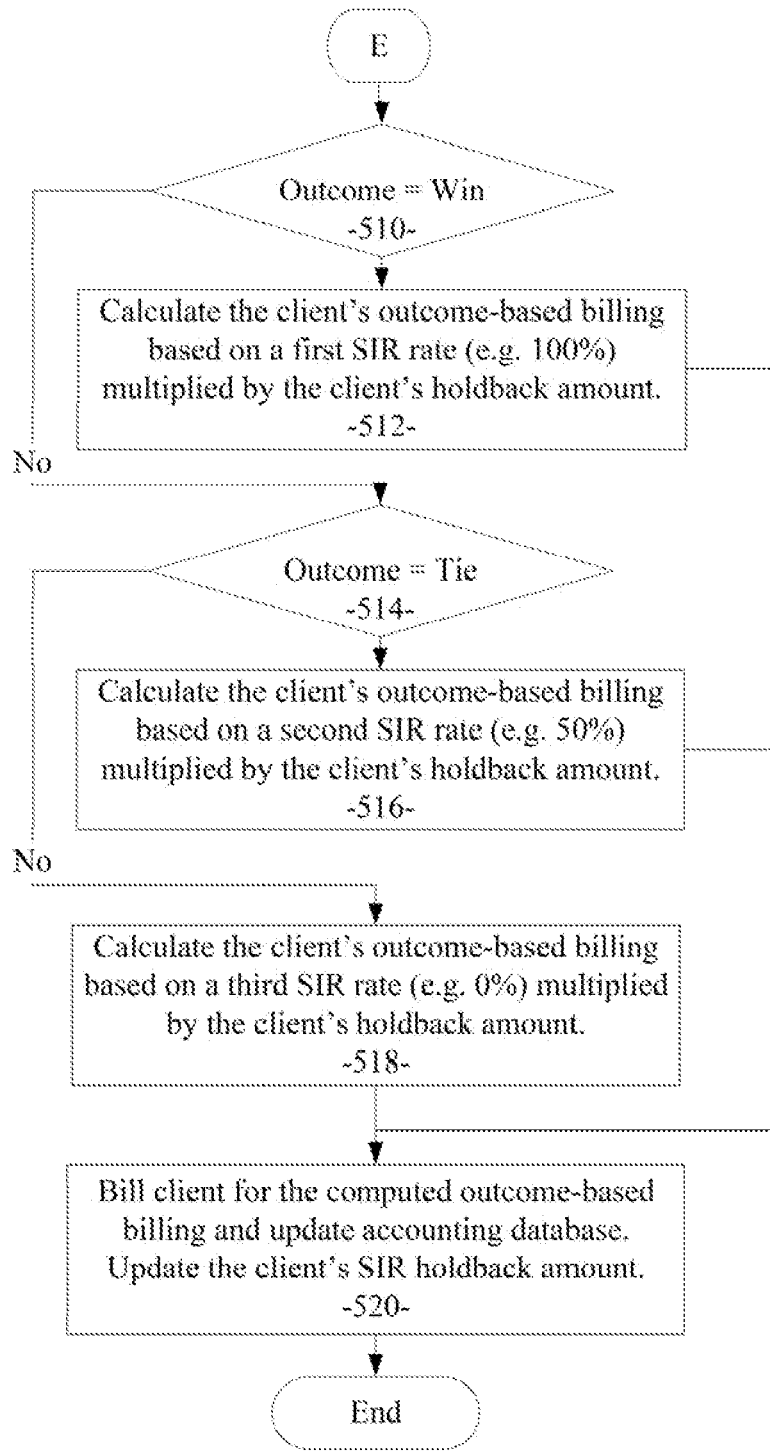

Referring now to FIGS. 8-10, flow diagrams illustrate the SIR Program processing logic used in one example embodiment. In processing block 491, a client may request or enroll in the SIR program. If the client is a new client that is not currently in the law service provider's system, standard client intake procedures may be used to gather necessary information from the client. Such SIR enrolment and client information gathering may be accomplished electronically using the networked system described above in connection with FIG. 1. In processing block 493, the client and a law service provider representative can agree on a set of legal matter outcomes and related SIR rates (i.e. rates at which the client will pay based on an outcome of the legal matter) and a related SIR holdback rate (i.e. a rate representing an amount held back from the client billing on a periodic basis as part of the benefits of the SIR program). These benefits include an opportunity for the client to pay graduated fees to the law service provider based on an outcome of a particular legal matter, such as litigation. In this manner, the law service provider and the client both share risk in the outcome of the legal matter. In one embodiment, the law service provider can establish fixed SIR rates and a fixed SIR holdback rate that is used for all its clients. Having agreed on SIR rates and a SIR holdback rate, the client can execute an engagement agreement that establishes an attorney/client relationship with the client and law service provider and includes information indicating the client has enrolled in the SIR program. In processing block 495, the client request (i.e. SIR program enrolment), the SIR rates, SIR holdback rate, the engagement agreement, and related client information is entered into the law service provider data repositories, including the client file database 355 and the accounting database 356. In processing block 497, the law service provider representatives, including attorneys, paralegals, and administrative staff can perform requested legal work for the client. The attorneys, paralegals, and other billable representatives of the law service provider enter their billable time for the client into the accounting database 356. It will be apparent to those of ordinary skill in the art that each billable representative of the law service provider can be billed to the client at different hourly rates. Such billing is typical in a conventional law firm. Processing continues at the bubble labelled D shown in FIG. 9.

Referring to FIG. 9, processing continues at the bubble labelled D. In processing block 500, the law service provider closes its periodic billing cycle. Typically, law service providers bill their clients on a monthly billing cycle, but other time periods can be equivalently used. In processing block 502, the client's gross billing for the time period is calculated based on a conventional billing model. In such a conventional billing model, the billable time recorded for each billable representative of the law service provider can be billed to the client along with any related client costs. This gross billing can be invoiced to the client and entered into the accounting database 356 in processing block 502. In processing block 504, the client's SIR holdback amount as accumulated in prior billing cycles can be obtained from the accounting database 356. In processing block 506, the client's gross billing for this billing period is multiplied by the SIR holdback rate for the client to produce the corresponding SIR holdback amount for this time period. In processing block 508, the calculated SIR holdback amount for this time period is added to the client's SIR holdback amount as accumulated in prior billing cycles. The total aggregated SIR holdback amount is updated in the accounting database 356 for the client and the client is billed the gross billing amount less the SIR holdback amount for this time period in block 509. Note that in the SIR billing model as described, the client is billed based on the billable time entered by each billable representative of the law service provider less the SIR holdback amount for this time period. However, the client also accumulates a SIR holdback amount that the client can use for a future legal matter at a SIR rate based on the outcome of the legal matter. This processing is shown in more detail in FIG. 10. Processing continues at the bubble labelled E shown in FIG. 10.

Referring now to FIG. 10, processing continues at the bubble labelled E. At the conclusion of the legal matter associated with the SIR program, one of the pre-defined and pre-agreed outcomes of the legal matter will have occurred. In this example, three possible outcomes are presented: a win (a first pre-defined outcome), a tie (a second pre-defined outcome), and any other outcome that is not a win or a tie (a third pre-defined outcome). As shown in decision block 510, if the outcome is a "win", the client's SIR outcome-based billing is calculated based on a first SIR rate (e.g. 100%) multiplied by the client's accumulated SIR holdback amount (processing block 512). In this case, the client can be expected to pay the full amount for the legal matter as the client received a favourable outcome. As such, the first SIR rate will produce an outcome-based billing to the client at most or all of the SIR holdback amount. This amount is billed to the client in block 520 and the client's billing records and SIR holdback amounts are updated in the accounting database 356.

As shown in decision block 514, if the outcome is a "tie", the client's SIR outcome-based billing is calculated based on a second SIR rate (e.g. 50%) multiplied by the client's accumulated SIR holdback amount (processing block 516). In this case, the client can be expected to pay only a partial amount for the legal matter as the client received an adequate but not favourable outcome. As such, the second SIR rate will produce an outcome-based billing to the client at some portion of the SIR holdback amount. This amount is billed to the client in block 520 and the client's billing records and SIR holdback amounts are updated in the accounting database 356.

As shown in block 518, if the outcome is a not a "win" or a "tie", the client's SIR outcome-based billing is calculated based on a third SIR rate (e.g. 0%) multiplied by the client's accumulated SIR holdback amount (processing block 518). In this case, the client can be expected to pay only a small amount or nothing for the legal matter as the client received an unfavourable outcome. As such, the third SIR rate will produce an outcome-based billing to the client at some small portion or none of the SIR holdback amount. This amount (if any) is billed to the client in block 520 and the client's billing records and SIR holdback amounts are updated in the accounting database 356. Processing terminates at the End bubble shown in FIG. 10.

Figure 11:
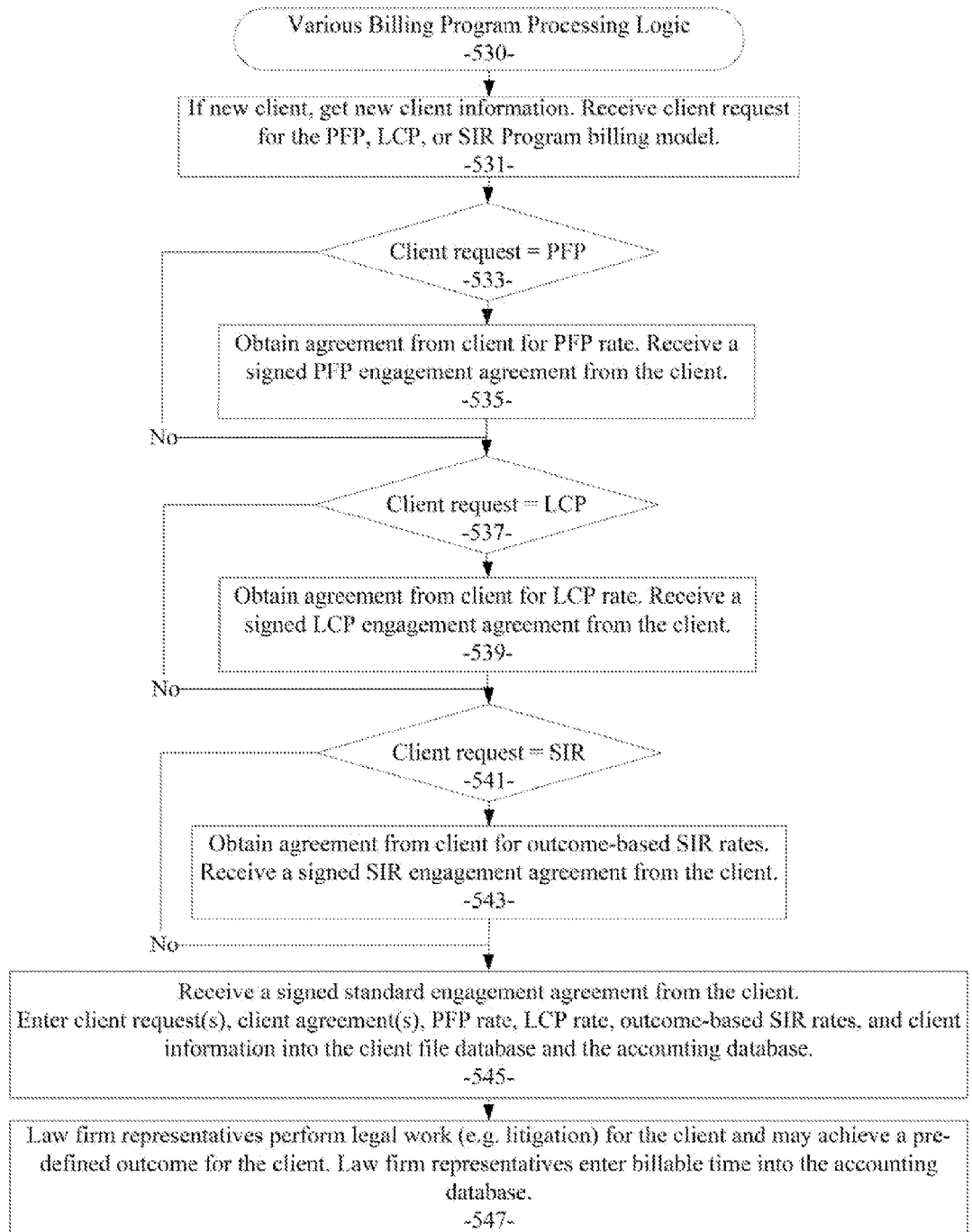
FIGS. 11-13 are flow diagrams illustrating a combination of the PFP Program, the LCP Program, and SIR Program processing logic used in one example embodiment.
Figure 12:
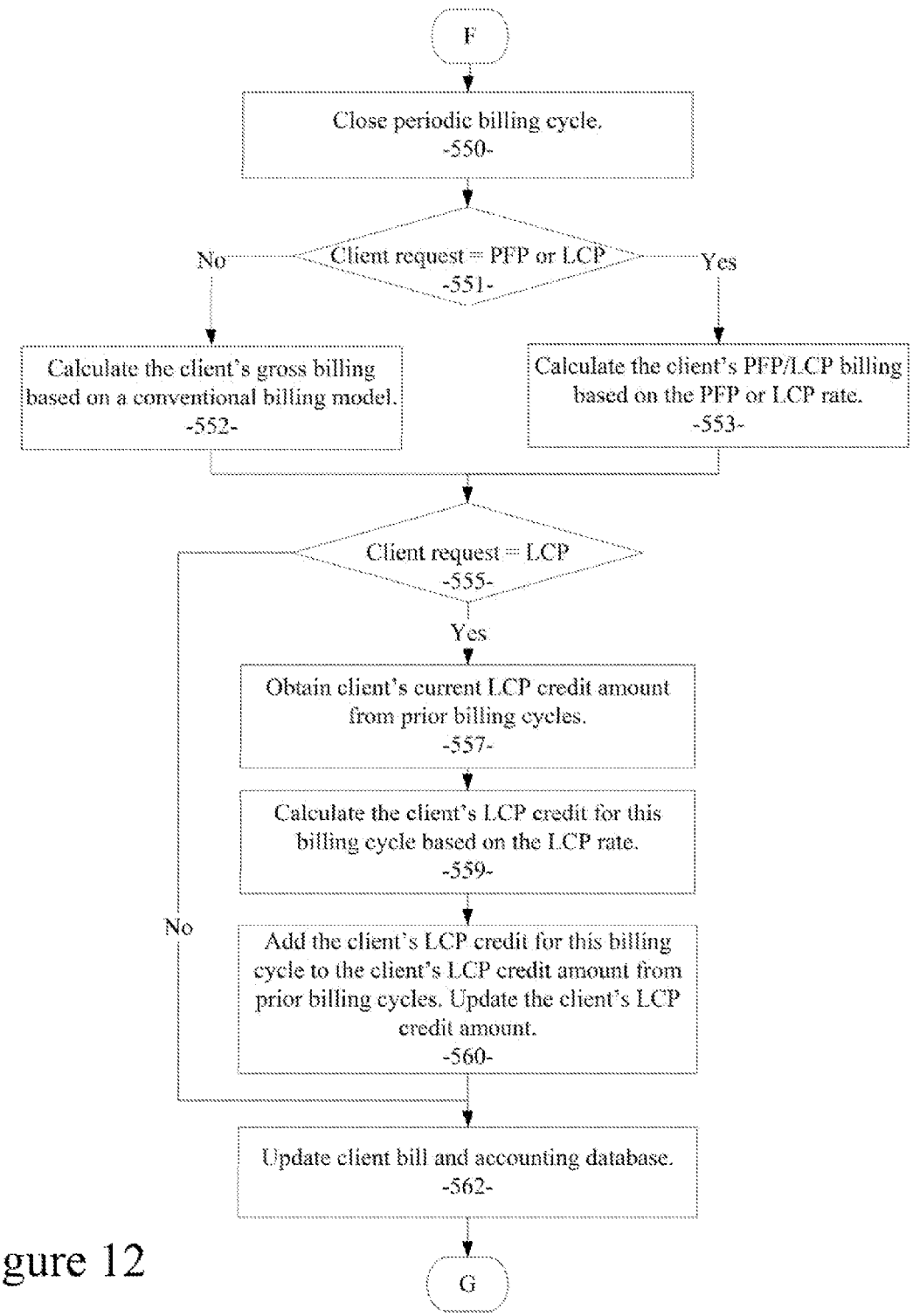
Figure 13:
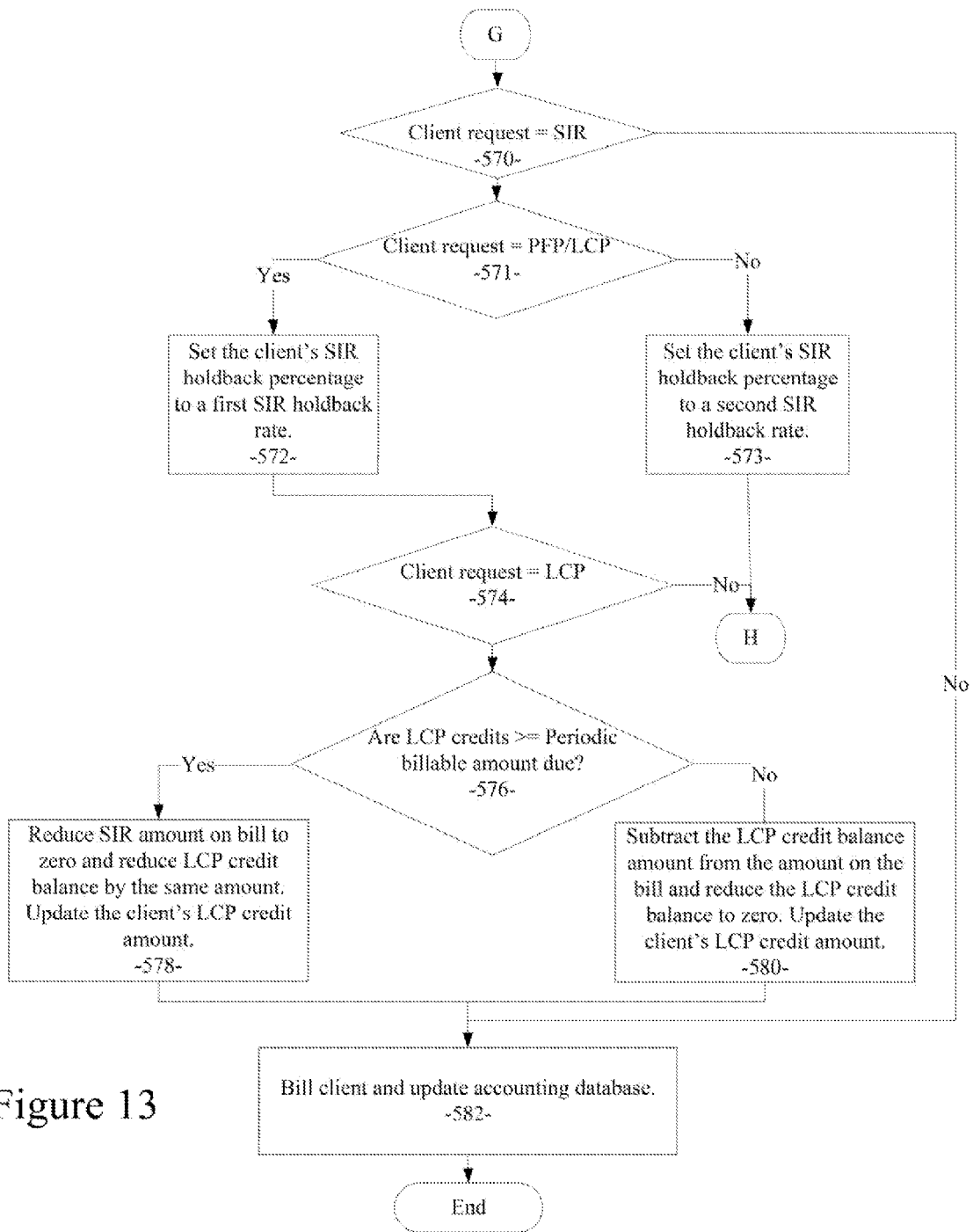
Figure 14:
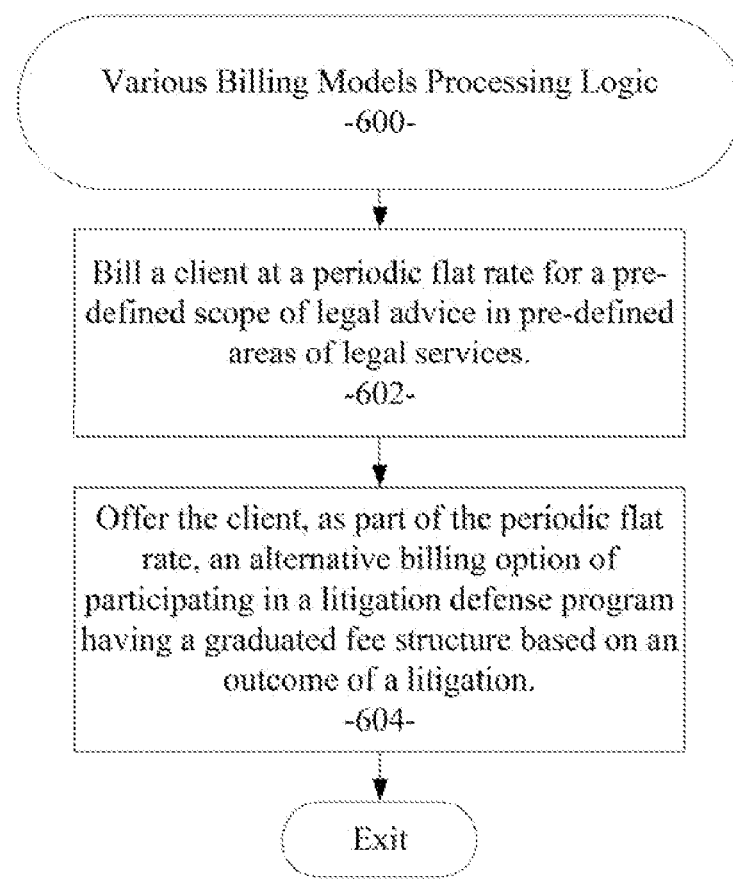
FIGS. 14-21 are flow diagrams illustrating various combinations of the billing models used in example embodiments.
Figure 15:
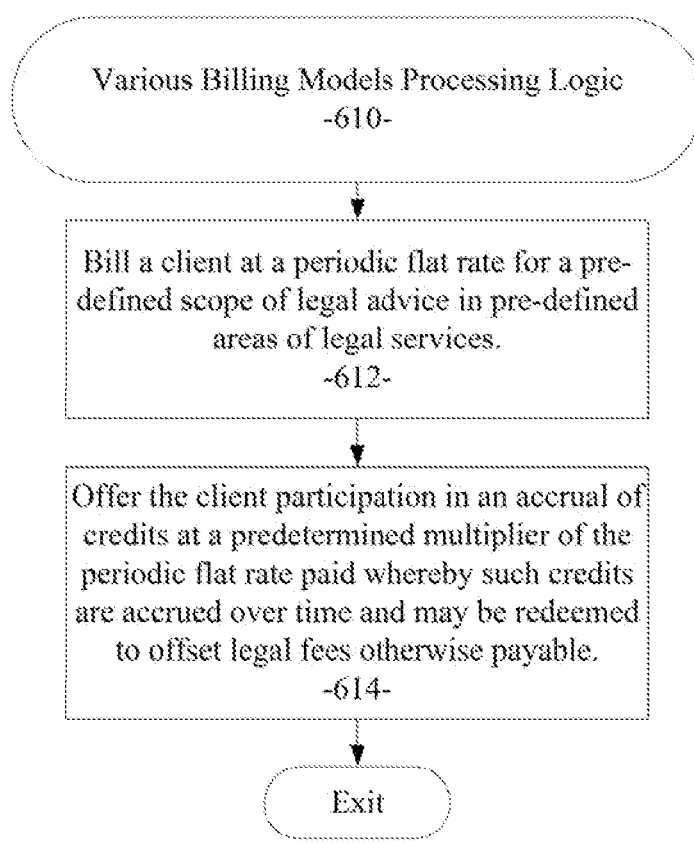
Figure 16:
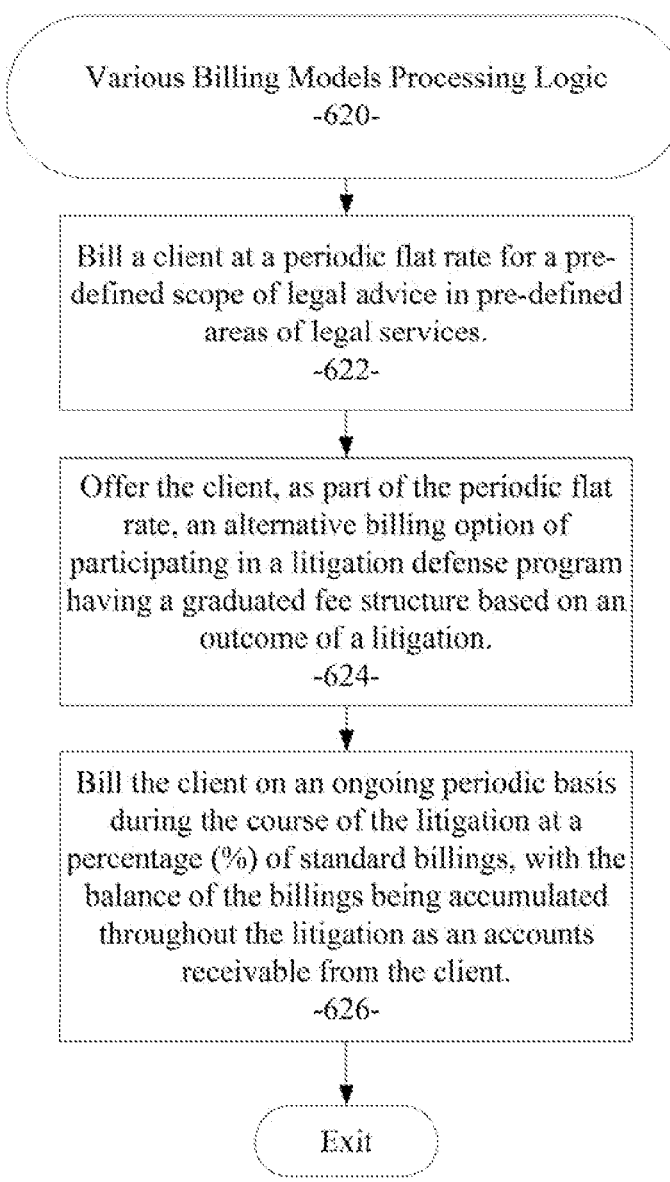
Figure 17:
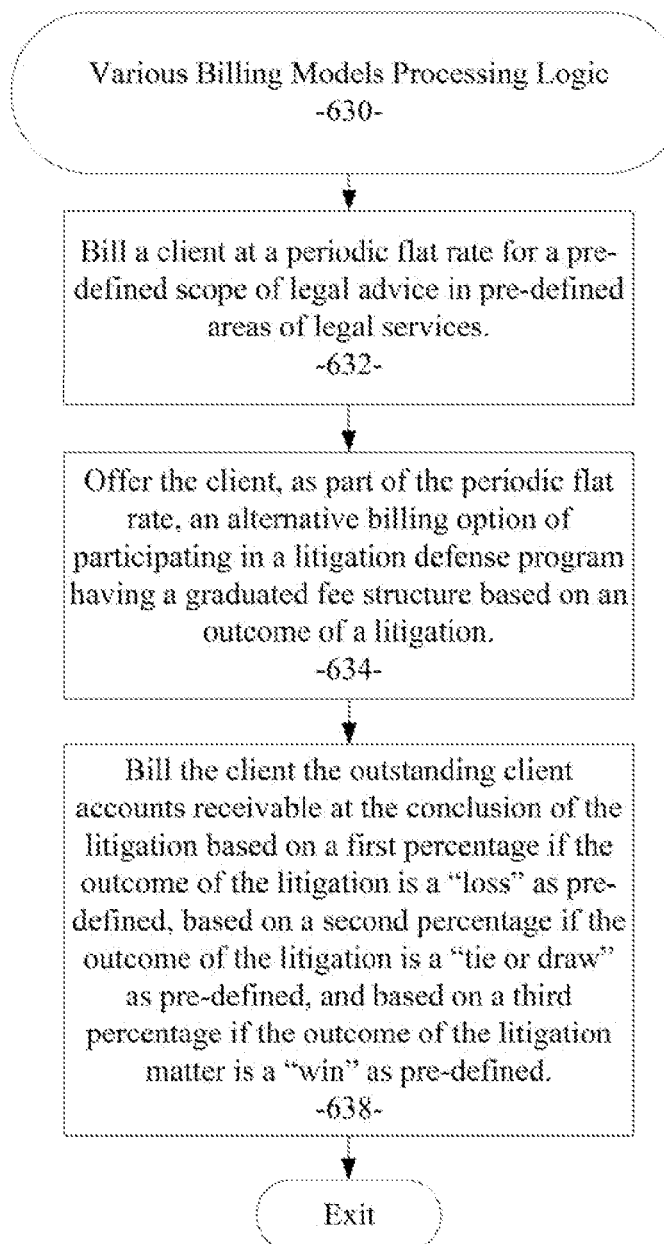
Figure 18:
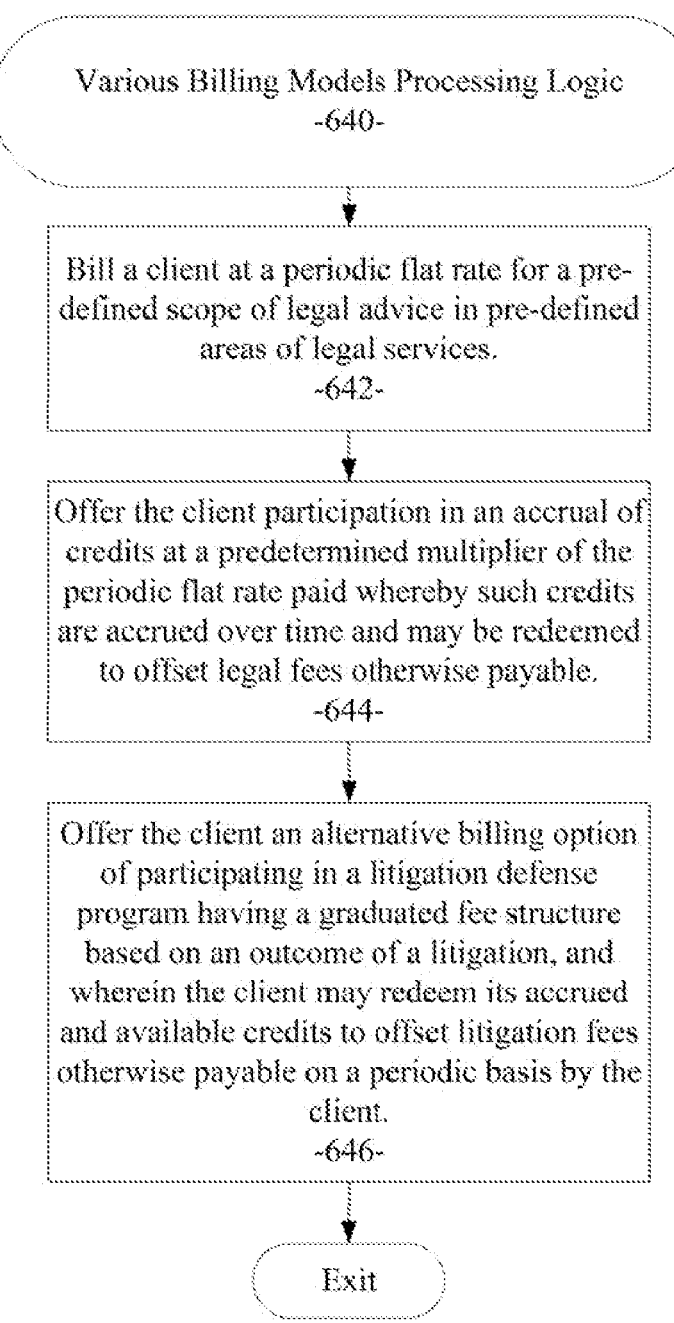
Figure 19:
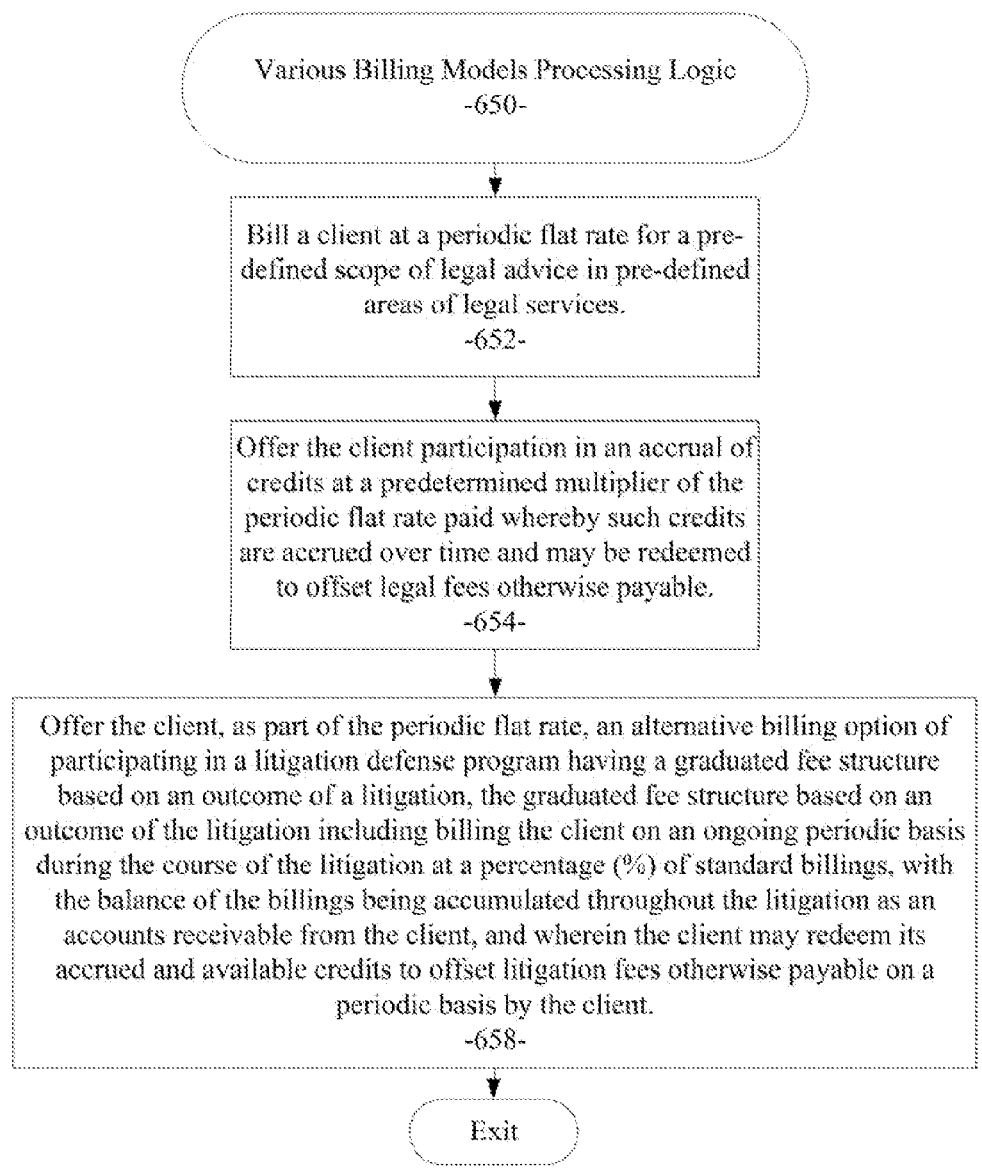
Figure 20:
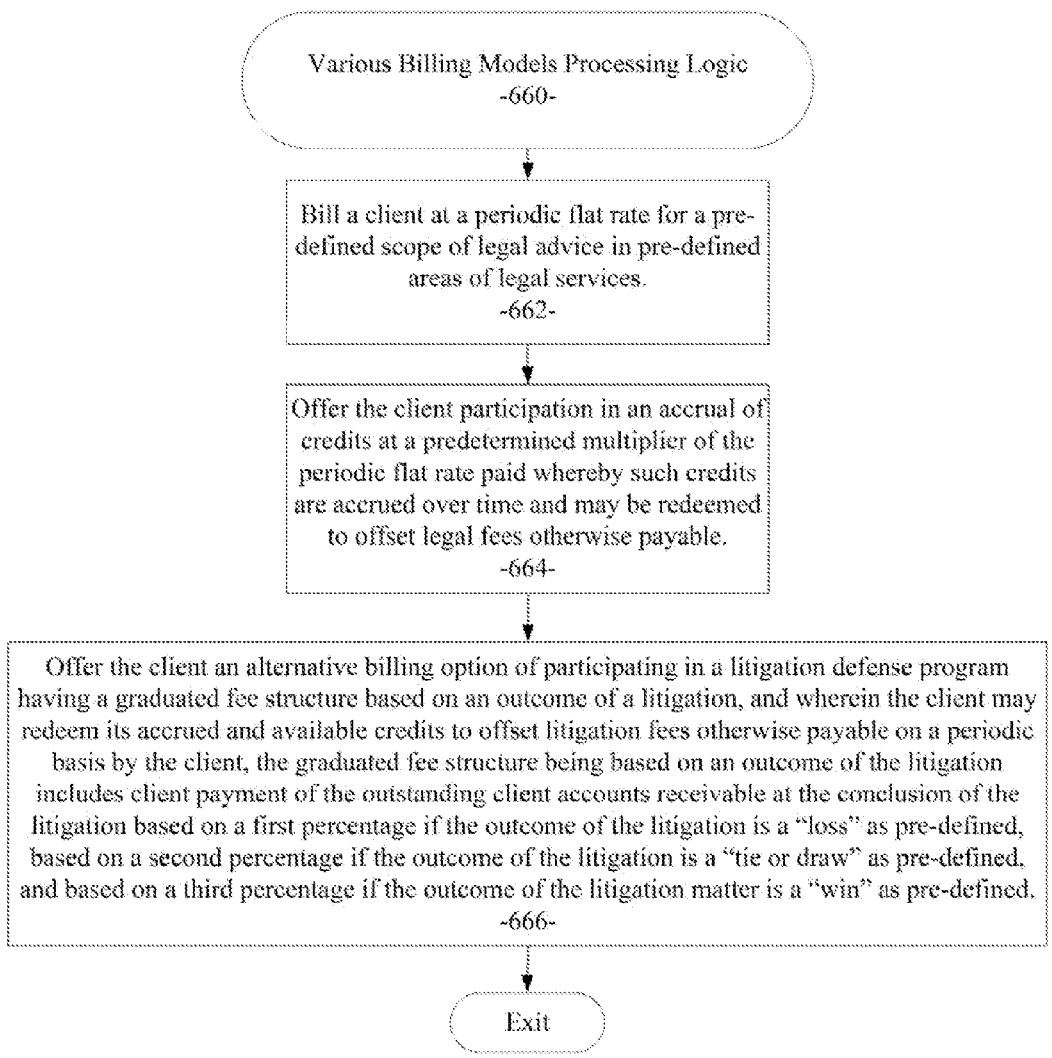
Figure 21:
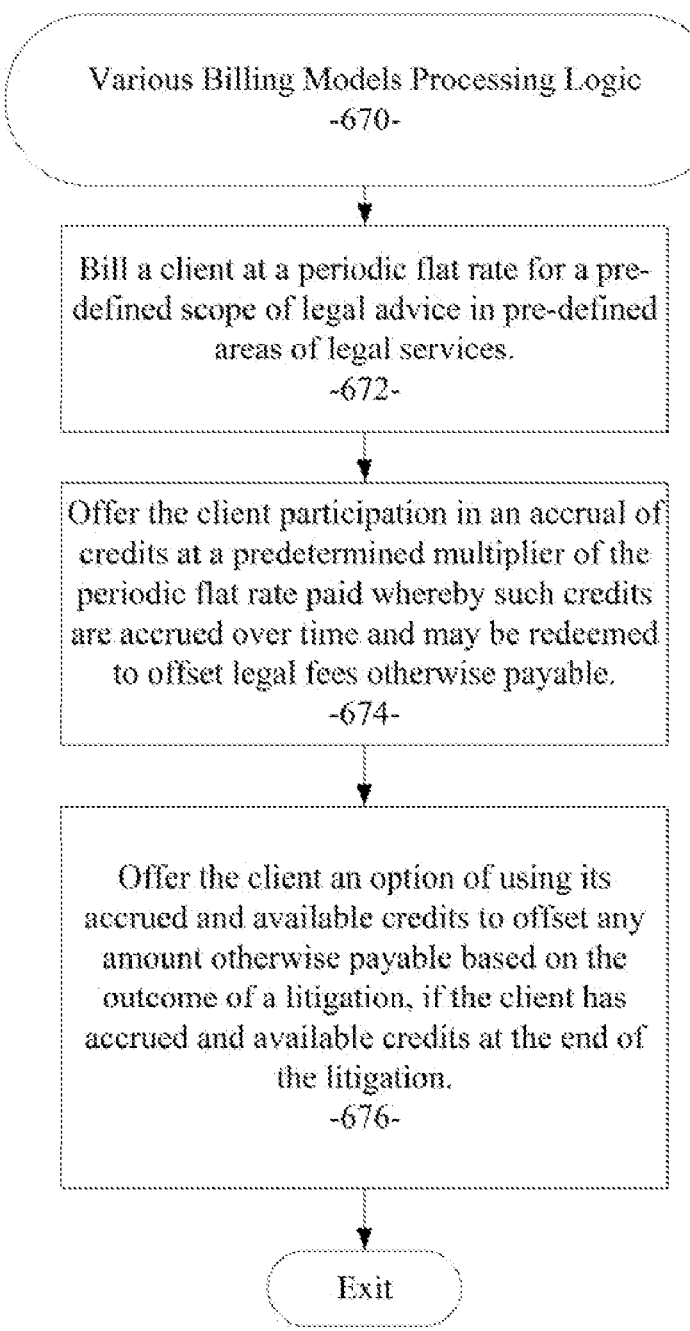

Referring now to FIGS. 11-13, flow diagrams illustrate a combination of the PFP Program, the LCP Program, and SIR Program processing logic used in one example embodiment. In processing block 530, a client may request or enroll in the PFP, LCP, and/or the SIR program. If the client is a new client that is not currently in the law service provider's system, standard client intake procedures may be used to gather necessary information from the client. Such PFP, LCP, and/or the SIR enrolment and client information gathering may be accomplished electronically using the networked system described above in connection with FIG. 1. If the client requests PFP enrolment (decision block 533), processing block 535 is performed. In this case, the client and a law service provider representative can agree on a rate (i.e. periodic fee) that will be charged to the client on a periodic basis for the benefits of the PFP program. These benefits include a pre-defined scope of legal advice, legal research and simple document review for a fixed periodic (e.g. monthly) fee. In one embodiment, the law service provider can establish a fixed PFP rate that is charged to all its clients. Having agreed on a PFP rate, the client can execute an engagement agreement that establishes an attorney/client relationship with the client and the law service provider and includes information indicating the client has enrolled in the PFP program.

If the client requests LCP enrolment (decision block 537), processing block 539 is performed. In this case, the client and a law service provider representative can agree on a rate/multiplier (i.e. a client credit accumulation rate) that will be accumulated for the client on a periodic basis as part of the benefits of the LCP program. These benefits include a higher level of legal service and an accumulation of a client credit that can be used for various client legal needs, such as litigation, due diligence investigations, merger/acquisition research, intellectual property investigation and prosecution, legal analysis, and the like. In one embodiment, the law service provider can establish a fixed LCP rate or multiplier that is used for client credit accumulation for all its clients. Having agreed on an LCP rate, the client can execute an engagement agreement that establishes an attorney/client relationship with the client and law service provider and includes information indicating the client has enrolled in the LCP program.

If the client requests SIR enrolment (decision block 541), processing block 543 is performed. In this case, the client and a law service provider representative can agree on a set of legal matter outcomes and related SIR rates (i.e. rates at which the client will pay based on an outcome of the legal matter) and a related SIR holdback rate (i.e. a rate representing an amount held back from the client billing on a periodic basis as part of the benefits of the SIR program). These benefits include an opportunity for the client to pay graduated fees to the law service provider based on an outcome of a particular legal matter, such as litigation. In this manner, the law service provider and the client both share risk in the outcome of the legal matter. In one embodiment, the law service provider can establish fixed SIR rates and a fixed SIR holdback rate that is used for all its clients. Having agreed on SIR rates and a SIR holdback rate, the client can execute an engagement agreement that establishes an attorney/client relationship with the client and law service provider and includes information indicating the client has enrolled in the SIR program.

In processing block 545, the client request (i.e. PFP program enrolment), the PFP rate, the client request (i.e. LCP program enrolment), the LCP rate, the client request (i.e. SIR program enrolment), the SIR rates, SIR holdback rate, the engagement agreement, and related client information is entered into the law service provider data repositories, including the client file database 355 and the accounting database 356. In processing block 547, the law service provider representatives, including attorneys, paralegals, and administrative staff can perform requested legal work for the client. In some cases, a pre-defined and pre-agreed outcome for a legal matter can be accomplished. The attorneys, paralegals, and other billable representatives of the law service provider enter their billable time for the client into the accounting database 356. It will be apparent to those of ordinary skill in the art that each billable representative of the law service provider can be billed to the client at different hourly rates. Such billing is typical in a conventional law firm. Processing continues at the bubble labelled F shown in FIG. 12.

Referring to FIG. 12, processing continues at the bubble labelled F. In processing block 550, the law service provider closes its periodic billing cycle. Typically, law service providers bill their clients on a monthly billing cycle, but other time periods can be equivalently used. In processing blocks 552 and 553, the client's gross billing for the time period is calculated based either on a conventional billing model (block 552) or a PFP/LCP billing model (block 553), depending on whether or not the client is enrolled in the PFP or LCP program (decision block 551). If the client is enrolled in the LCP program (decision block 555), processing block 557 is performed. In block 557, the client's LCP credit as accumulated in prior billing cycles can be obtained from the accounting database 356. In processing block 559, the client's gross billing for this billing period is multiplied by the LCP rate for the client to produce the corresponding LCP client credit for this time period. In processing block 560, the calculated LCP client credit for this time period is added to the client's LCP credit as accumulated in prior billing cycles. The total aggregated LCP client credit is updated in the accounting database 356 for the client and the client is billed the LCP billing amount in block 562. Note that in the LCP billing model as described, the client is billed based on either the LCP model or the billable time entered by each billable representative of the law service provider. However, the client also accumulates an LCP client credit that the client can use for a future legal matter, such as litigation. In such a legal matter, the client can elect to apply some or all of its LCP client credit to pay one or more invoices billed to the client from the law service provider. If the client is not enrolled in the LCP program (decision block 555), the client is billed the gross billing amount in block 562 and no LCP credit is accumulated. Processing continues at the bubble labelled G shown in FIG. 13.

Referring to FIG. 13, processing continues at the bubble labelled G. In decision block 570, if the client is not enrolled in the SIR program, the client is billed and the accounting database is updated in block 582. Processing terminates at the End bubble shown in FIG. 13. If the client is enrolled in the SIR program (decision block 570), decision block 571 is performed. If the client is enrolled in the PFP or LCP programs, processing block 572 is performed and the client's SIR holdback rate is set at a first (more favourable) SIR holdback rate. If the client is not enrolled in the PFP or LCP programs, processing block 573 is performed and the client's SIR holdback rate is set at a second (less favourable) SIR holdback rate. If the client is not enrolled in the LCP program (decision block 574), processing continues at the bubble labelled H shown in FIG. 9 where the client's SIR holdback amount is calculated. If the client is enrolled in the LCP program (decision block 574), processing continues at decision block 576. Starting at decision block 576, the client's LCP credits may be applied against a billable amount owed by the client to the law service provider. If the client's LCP credits are greater than or equal to the periodic billable amount owed by the client to the law service provider, processing block 578 is performed. In this case, the client's SIR amount on the bill is zeroed out and the LCP credit balance is reduced by the same amount. The client's LCP credit amount is similarly updated (processing block 578). If the client's LCP credits are less than the periodic billable amount owed by the client to the law service provider, processing block 580 is performed. In this case, the client's LCP credit balance is subtracted from the periodic billable amount owed by the client to the law service provider and the client's LCP credit balance is zeroed out. The client's LCP credit amount is similarly updated (processing block 580). The client is billed and the accounting database is updated in block 582. Processing terminates at the End bubble shown in FIG. 13.

Referring now to FIGS. 14-21, flow diagrams illustrate various combinations of the billing models used in example embodiments.

Figure 22:
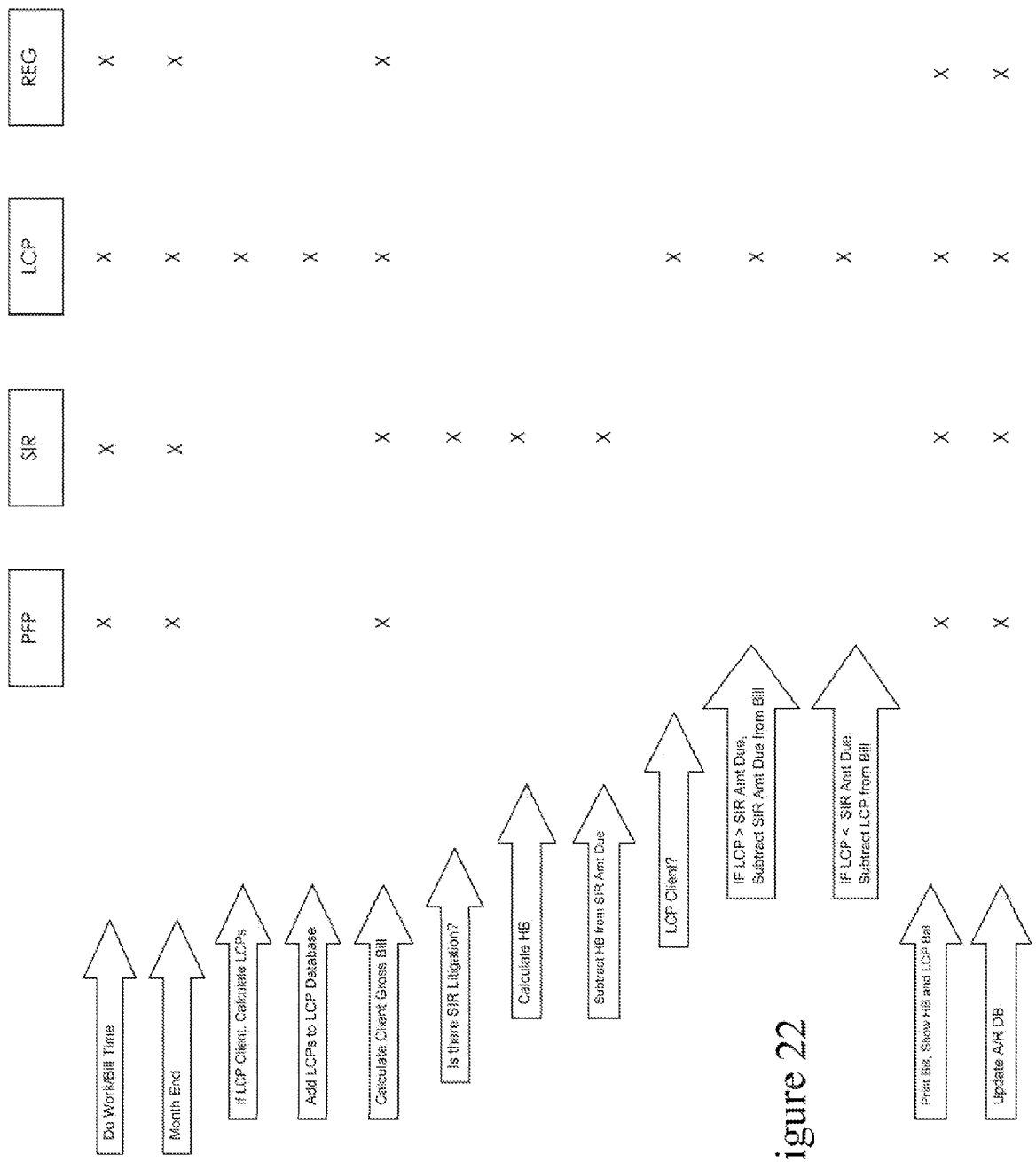
FIG. 22 illustrates a collection of actions performed for the various billing models for the periodic client billing process.

FIG. 22 illustrates a collection of actions performed for the various billing models for the periodic client billing process.

Figure 23:
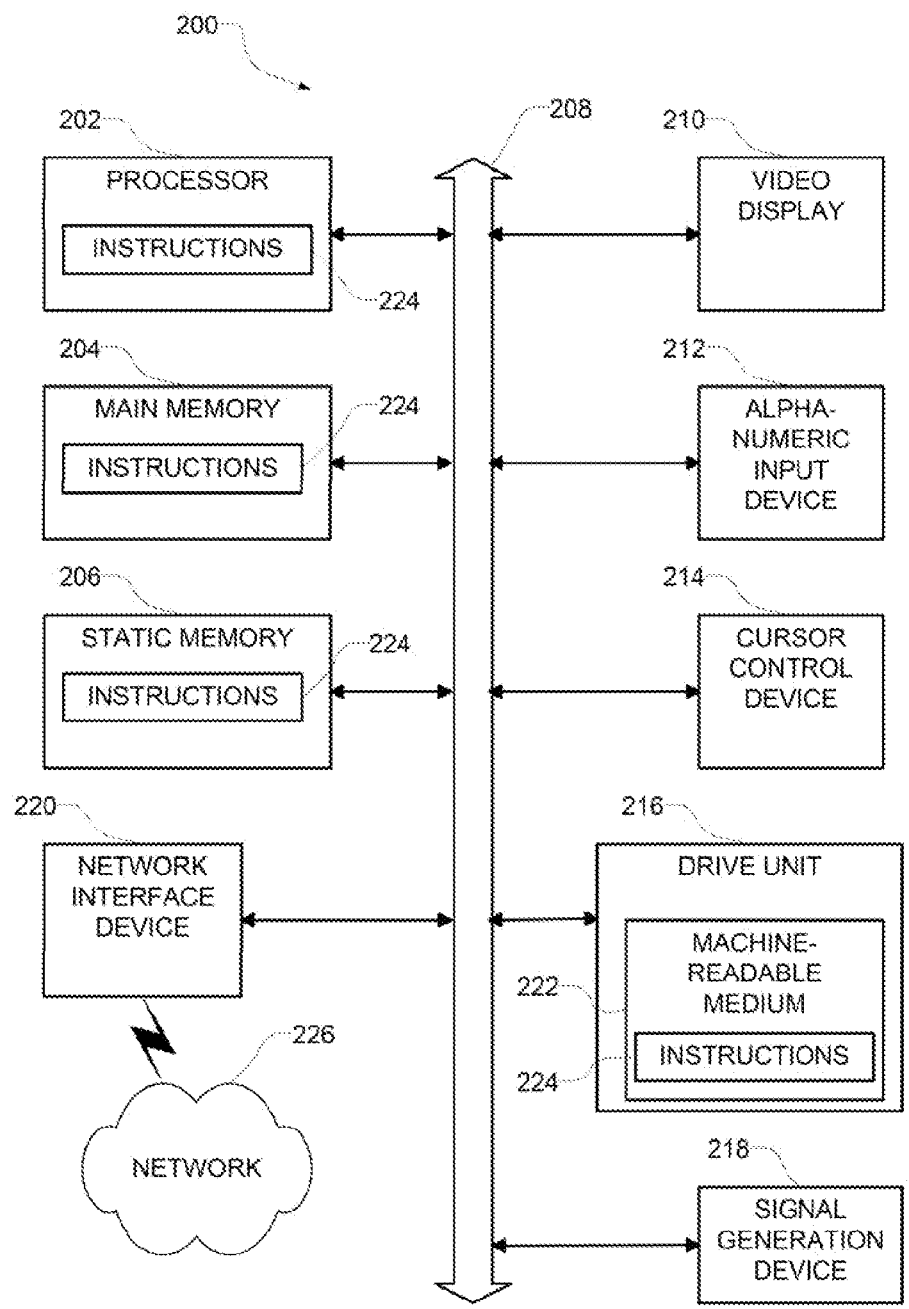
FIG. 23 shows a diagrammatic representation of machine in the example form of a computer system within which a set of instructions, for causing the machine to perform any one or more of the methodologies discussed herein, may be executed.

FIG. 23 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    providing a billing program for a legal services client, the billing program including each of the following components:
        periodic flat rate charges billable to the client on a regularly occurring basis for a pre-defined scope of legal service, the periodic flat rate charges being independent of time spent by providers of the legal service, and
        litigation defense charges billable to the client according to a graduated fee structure based in part on an outcome of a litigation, such litigation being within the scope of legal service provided under the periodic flat rate, the litigation defense charges being subject to a holdback at a first rate for a client not currently paying the periodic flat rate charges, the holdback being at a second rate for a client currently paying the periodic flat rate charges, the second rate being greater than the first rate, the litigation defense charge, holdback thus being based in part on payment of the periodic flat rate and the litigation being within the scope of legal service provided under the periodic flat rate; and
    using a processor to generate a billing for the legal services client, the billing including periodic flat rate charges and litigation defense charges associated with the legal services client.

2. The method as claimed in claim 1 wherein the billing program further including:
    an accrual of credits at a predetermined multiplier of the periodic flat rate, which credits accrue over time and are redeemable to offset litigation defense charges otherwise billable, the accrual of credits being based in part on continued payment of the periodic flat rate by the legal services client; and
    using the processor to generate a billing for the legal services client, the billing including periodic flat rate charges, litigation defense charges, and an accrual of credits associated with the legal services client.

3. The method as claimed in claim 1 wherein the graduated fee structure based on an outcome of the litigation includes billing the client on an ongoing periodic basis during the course of the litigation at a percentage (%) of standard billings, with the balance of the billings being accumulated throughout the litigation as an accounts receivable (the holdback) from the client.

4. The method as claimed in claim 1 wherein the graduated fee structure based on an outcome of the litigation includes client billing of the outstanding client accounts receivable (the holdback) at the conclusion of the litigation based on a first percentage if the outcome of the litigation is a "loss" as pre-defined, based on a second percentage if the outcome of the litigation is a "tie or draw" as pre-defined, and based on a third percentage if the outcome of the litigation matter is a "win" as pre-defined.

5. The method as claimed in claim 2 wherein the client may redeem its accrued and available credits to offset litigation fees otherwise payable on a periodic basis by the client.

6. The method as claimed in claim 1 wherein the periodic flat rate charges billable to the client on a regularly occurring basis for a pre-defined scope of legal service is part of a Predictable Fee Program (PFP) program.

7. The method as claimed in claim 1 wherein the litigation defense charges are part of a Share In Risk Program (SIR) program.

8. The method as claimed in claim 2 wherein the accrual of credits is part of a Litigation Credit Program (LCP) program.

9. The method as claimed in claim 1 wherein the litigation defense charges subject to a holdback are held in a client holdback account.

10. The method as claimed in claim 9 wherein the legal services client pays differing amounts from the client holdback account based on the outcome of the litigation.

11. An article of manufacture comprising a non-transitory machine-readable medium having machine executable instructions embedded thereon, which when executed by a machine, cause the machine to:
    provide a billing program for a legal services client, the billing program including each of the following components:
        periodic flat rate charges billable to the client on a regularly occurring basis for a pre-defined scope of legal service, the periodic flat rate charges being independent of time spent by providers of the legal service, and
        litigation defense charges billable to the client according to a graduated fee structure based in part on an outcome of a litigation, such litigation being within the scope of legal service provided under the periodic flat rate, the litigation defense charges being subject to a holdback at a first rate for a client not currently paying the periodic flat rate charges, the holdback being at a second rate for a client currently paying the periodic flat rate charges, the second rate being greater than the first rate, the litigation defense charge holdback thus being based in part on payment of the periodic flat rate and the litigation being within the scope of legal service provided under the periodic flat rate; and generate a billing for the legal services client, the billing including periodic flat rate charges and litigation defense charges associated with the legal services client.

12. The article of manufacture as claimed in claim 11 wherein the billing program further including:

an accrual of credits at a predetermined multiplier of the periodic flat rate, which credits accrue over time and are redeemable to offset litigation defense charges otherwise billable, the accrual of credits being based in part on continued payment of the periodic flat rate by the legal services client; and the machine executable instructions being further configured to generate a billing for the legal services client, the billing including periodic flat rate charges, litigation defense charges, and an accrual of credits associated with the legal services client.

13. The article of manufacture as claimed in claim 11 wherein the graduated fee structure based on an outcome of the litigation being configured to bill the client on an ongoing periodic basis during the course of the litigation at a percentage (%) of standard billings, with the balance of the billings being accumulated throughout the litigation as an accounts receivable (the holdback) from the client.

14. The article of manufacture as claimed in claim 11 wherein the graduated fee structure based on an outcome of the litigation includes client billing of the outstanding client accounts receivable (the holdback) at the conclusion of the litigation based on a first percentage if the outcome of the litigation is a "loss" as pre-defined, based on a second percentage if the outcome of the litigation is a "tie or draw" as pre-defined, and based on a third percentage if the outcome of the litigation matter is a "win" as pre-defined.

15. The article of manufacture as claimed in claim 12 wherein the client may redeem its accrued and available credits to offset litigation fees otherwise payable on a periodic basis by the client.

16. The article of manufacture as claimed in claim 11 wherein the periodic flat rate charges billable to the client on a regularly occurring basis for a pre-defined scope of legal service is part of a Predictable Fee Program (PFP) program.

17. The article of manufacture as claimed in claim 11 wherein the litigation defense charges subject to a holdback are held in a client holdback account.

18. The article of manufacture as claimed in claim 17 wherein the legal services client pays differing amounts from the client holdback account based on the outcome of the litigation.

19. A client billing system comprising:

a processor;

a memory coupled to the processor;

a billing program, executable by the processor, the billing program including each of the following components:

periodic flat rate charges billable to a legal services client on a regularly occurring basis for a pre-defined scope of legal service, the periodic flat rate charges being independent of time spent by providers of the legal service, and litigation defense charges billable to the client according to a graduated fee structure based in part on an outcome of a litigation, such litigation being within the scope of legal service provided under the periodic flat rate, the litigation defense charges being subject to a holdback at a first rate for a client not currently paying the periodic flat rate charges, the holdback being at a second rate for a client currently paying the periodic flat rate charges, the second rate being greater than the first rate, the litigation defense charge holdback thus being based in part on payment of the periodic flat rate and the litigation being within the scope of legal service provided under the periodic flat rate; and a billing generation module for generating a billing for the legal services client, the billing including periodic flat rate charges and litigation defense charges associated with the legal services client.

20. The client billing system as claimed in claim 19 wherein the billing program further including:

an accrual of credits at a predetermined multiplier of the periodic flat rate, which credits accrue over time and are redeemable to offset litigation defense charges otherwise billable, the accrual of credits being based in part on continued payment of the periodic flat rate by the legal services client; and the billing generation module being further configured to generate a billing for the legal services client, the billing including periodic flat rate charges, litigation defense charges, and an accrual of credits associated with the legal services client.

* * * * *